(12) United States Patent
Toll et al.

(10) Patent No.: US 11,355,905 B2
(45) Date of Patent: Jun. 7, 2022

(54) ADJUSTABLE P-CLAMP WITH MULTIPLE MOUNTING OPTIONS

(71) Applicant: HellermannTyton Corporation, Milwaukee, WI (US)

(72) Inventors: Michael Toll, Whitefish Bay, WI (US); Gerard G. Geiger, Jackson, WI (US); Christopher J. Rohde, West Allis, WI (US); Jonathan Zick, Waukesha, WI (US); Walter P. Trautfield, San Francisco, CA (US)

(73) Assignee: HellermannTyton Corporation, Milwaukee, WI (US)

( * ) Notice: Subject to any disclaimer, the term of this patent is extended or adjusted under 35 U.S.C. 154(b) by 0 days.

(21) Appl. No.: 17/136,945

(22) Filed: Dec. 29, 2020

(65) Prior Publication Data
US 2021/0119430 A1    Apr. 22, 2021

Related U.S. Application Data

(60) Division of application No. 16/147,668, filed on Sep. 29, 2018, now Pat. No. 10,903,632, which is a
(Continued)

(51) Int. Cl.
*H02G 3/04* (2006.01)
*F16L 3/10* (2006.01)
(Continued)

(52) U.S. Cl.
CPC ............. *H02G 3/0456* (2013.01); *F16B 2/10* (2013.01); *F16L 3/1058* (2013.01);
(Continued)

(58) Field of Classification Search
CPC combination set(s) only.
See application file for complete search history.

(56) References Cited

U.S. PATENT DOCUMENTS

| 1,308,869 A | 7/1919 | Rohmer |
| 1,365,626 A | 1/1921 | Pleister et al. |

(Continued)

FOREIGN PATENT DOCUMENTS

| CN | 103998843 | 8/2014 |
| CN | 108457938 | 8/2018 |

(Continued)

OTHER PUBLICATIONS

"European Search Report", EP Application No. 18200778.1, dated Feb. 6, 2019, 4 pages.
(Continued)

*Primary Examiner* — Monica E Millner
(74) *Attorney, Agent, or Firm* — Colby Nipper PLLC

(57) ABSTRACT

A mounting bracket assembly for securement of elongate items, such as wires, cables, or other bundles items to a support structure. The mounting bracket assembly may include a clamp member defining a first clamp member and a second clamp member joined to the first clamp member by a hinge mechanism. The mounting bracket assembly may also include a locking mechanism, a wedge-shaped pawl having a plurality of teeth disposed within the slotted opening, and a mounting member defining a mounting aperture configured to receive an attachment feature therethrough.

20 Claims, 19 Drawing Sheets

Related U.S. Application Data continuation-in-part of application No. 15/423,419, filed on Feb. 2, 2017, now Pat. No. 10,119,631.

(60) Provisional application No. 62/291,965, filed on Feb. 5, 2016.

(51) Int. Cl.
| | | |
|---|---|---|
| *H02G 3/32* | (2006.01) | |
| *F16L 3/237* | (2006.01) | |
| *F16B 2/10* | (2006.01) | |
| *F16L 3/127* | (2006.01) | |
| *F16L 3/123* | (2006.01) | |
| *F16B 5/06* | (2006.01) | |
| *F16B 7/04* | (2006.01) | |

(52) U.S. Cl.
CPC ............ *F16L 3/1075* (2013.01); *F16L 3/237* (2013.01); *H02G 3/32* (2013.01); *F16B 5/0685* (2013.01); *F16B 7/0433* (2013.01); *F16L 3/123* (2013.01); *F16L 3/127* (2013.01)

(56) References Cited

U.S. PATENT DOCUMENTS

| | | | | |
|---|---|---|---|---|
| 2,884,214 | A * | 4/1959 | Wrobel | F16L 3/137 248/74.3 |
| 3,581,349 | A * | 6/1971 | Verspieren | F16L 3/12 24/16 PB |
| 3,632,070 | A | 1/1972 | Thayer et al. | |
| 4,264,047 | A * | 4/1981 | Nelson | F16L 3/12 24/339 |
| 4,318,518 | A | 3/1982 | Davis | |
| 4,386,752 | A * | 6/1983 | Pavlak | F16L 3/127 248/73 |
| 4,609,171 | A * | 9/1986 | Matsui | F16L 3/12 24/16 PB |
| 4,779,828 | A * | 10/1988 | Munch | H02G 3/32 248/74.3 |
| D323,106 | S * | 1/1992 | Daigle | D8/396 |
| 5,221,065 | A | 6/1993 | Siems et al. | |
| 5,305,978 | A | 4/1994 | Current | |
| 5,344,112 | A * | 9/1994 | Peterson | B60H 1/3229 24/279 |
| 5,354,021 | A * | 10/1994 | Farrell | F16L 3/233 24/16 PB |
| 5,367,750 | A | 11/1994 | Ward et al. | |
| 5,390,876 | A * | 2/1995 | Hatano | F16L 3/1075 248/68.1 |
| 5,494,245 | A * | 2/1996 | Suzuki | F16L 3/1075 24/487 |
| 5,664,754 | A | 9/1997 | Gaenslen | |
| 5,820,083 | A | 10/1998 | Geiger | |
| 5,937,488 | A * | 8/1999 | Geiger | F16L 3/1033 24/339 |
| 5,941,483 | A | 8/1999 | Baginski | |
| 6,443,403 | B1 * | 9/2002 | Page | F16L 3/1233 24/16 PB |
| 6,533,226 | B2 | 3/2003 | Geiger | |
| 6,592,083 | B1 | 7/2003 | Hobson et al. | |
| 6,732,982 | B1 * | 5/2004 | Messinger | F16L 3/1233 24/16 PB |
| 6,809,257 | B2 * | 10/2004 | Shibuya | B60R 16/0215 174/481 |
| 7,448,579 | B2 * | 11/2008 | Kwilosz | F16B 5/0685 248/71 |
| 7,661,631 | B2 | 2/2010 | Ibaraki | |
| 7,887,012 | B2 | 2/2011 | Desai et al. | |
| 8,020,812 | B2 * | 9/2011 | Matsuno | F16L 3/1075 248/71 |
| 8,025,258 | B2 | 9/2011 | Eldridge | |
| 8,328,457 | B2 * | 12/2012 | Werth | F16L 23/04 403/289 |
| 8,333,514 | B2 | 12/2012 | Weimer | |
| 8,708,289 | B2 * | 4/2014 | Allenbach | F16L 3/2235 248/68.1 |
| 8,833,706 | B2 * | 9/2014 | Elsmore | F16L 3/1075 248/74.4 |
| 8,870,135 | B2 | 10/2014 | Grubbs | |
| 8,967,556 | B2 * | 3/2015 | Meyers | B60R 16/0215 248/74.1 |
| 8,979,039 | B2 * | 3/2015 | Shiga | F16L 55/035 248/73 |
| 8,991,774 | B2 | 3/2015 | Hajduch | |
| 9,188,247 | B2 * | 11/2015 | Pauchet | H02G 3/32 |
| 9,653,901 | B2 * | 5/2017 | Miyamoto | F16L 3/1025 |
| 9,718,591 | B2 | 8/2017 | Lu et al. | |
| 10,036,487 | B2 | 7/2018 | Duggan | |
| 10,119,631 | B2 | 11/2018 | Toll et al. | |
| 10,903,632 | B2 | 1/2021 | Toll et al. | |
| 10,982,795 | B2 * | 4/2021 | Tally | F16L 3/222 |
| 2004/0076465 | A1 | 4/2004 | Geiger | |
| 2005/0116122 | A1 * | 6/2005 | Nakanishi | F16L 3/223 248/68.1 |
| 2005/0253025 | A1 * | 11/2005 | Benoit | F16L 3/13 248/74.1 |
| 2010/0207001 | A1 * | 8/2010 | Smith | F16L 3/237 248/230.4 |
| 2010/0243824 | A1 * | 9/2010 | Desai | F16L 3/127 248/65 |
| 2012/0217354 | A1 | 8/2012 | Walraven et al. | |
| 2012/0227221 | A1 * | 9/2012 | Whitaker | F16B 2/10 24/459 |
| 2013/0001373 | A1 | 1/2013 | Ogawa | |
| 2013/0160246 | A1 | 6/2013 | Hajduch | |
| 2014/0151514 | A1 | 6/2014 | Asai | |
| 2016/0114743 | A1 | 4/2016 | Miyamoto et al. | |
| 2017/0146154 | A1 | 5/2017 | Tally et al. | |
| 2017/0227141 | A1 | 8/2017 | Toll et al. | |
| 2017/0297516 | A1 | 10/2017 | Loebe | |
| 2019/0036314 | A1 | 1/2019 | Toll et al. | |

FOREIGN PATENT DOCUMENTS

| | | |
|---|---|---|
| DE | 1275650 | 8/1968 |
| DE | 19856945 | 6/2000 |
| DE | 102006025706 | 12/2007 |
| DE | 102009034546 | 7/2011 |
| EP | 0069223 | 1/1983 |
| EP | 2056419 | 5/2009 |
| EP | 2058242 | 5/2009 |
| EP | 2141397 | 1/2020 |
| FR | 2322286 | 3/1977 |
| FR | 2437086 | 4/1980 |
| JP | 2002199555 | 7/2002 |
| JP | 2013143842 | 7/2013 |
| JP | 2014108032 | 6/2014 |
| JP | 2014138517 | 7/2014 |
| RU | 2535452 | 12/2014 |

OTHER PUBLICATIONS

"Extended European Search Report", EP Application No. 17154684.9, dated Jun. 22, 2017, 8 pages.
"Extended European Search Report", EP Application No. 19199457.3, dated Jul. 27, 2020, 11 pages.
"Non-Final Office Action", U.S. Appl. No. 15/423,419, filed Jan. 11, 2018, 10 pages.
"Non-Final Office Action", U.S. Appl. No. 16/147,668, filed May 13, 2020, 5 pages.
"Notice of Allowance", U.S. Appl. No. 16/147,668, filed Jul. 2, 2018, 10 pages.
"Notice of Allowance", U.S. Appl. No. 16/147,668, filed Sep. 17, 2020, 5 pages.
"Partial European Search Report", EP Application No. 19199457.3, dated Feb. 5, 2020, 12 pages.
"Restriction Requirement", U.S. Appl. No. 16/147,668, filed Feb. 18, 2020, 6 pages.
"Restriction Requirement", U.S. Appl. No. 15/423,419, filed Dec. 13, 2017, 7 pages.

(56) References Cited

OTHER PUBLICATIONS

"Supplemental Notice of Allowance", U.S. Appl. No. 16/147,668, filed Dec. 23, 2020, 2 pages.
"Supplemental Notice of Allowance", U.S. Appl. No. 16/147,668, filed Dec. 24, 2020, 2 pages.
"Foreign Office Action", CN Application No. 201910924869.8, dated Dec. 25, 2020, 21 pages.
"Foreign Office Action", JP Application No. 2019-164417, dated Apr. 15, 2021, 4 pages.
"Foreign Office Action", CN Application No. 201910924869.8, dated Jun. 15, 2021, 13 pages.
"Foreign Office Action", CN Application No. 201710066210.4, dated Jan. 21, 2020, 13 pages.
"Foreign Office Action", KR Application No. 10-2019-0117178, dated Sep. 1, 2020, 16 pages.
"Foreign Office Action", CN Application No. 201910924869.8, dated Sep. 9, 2021, 10 pages.
"Foreign Office Action", JP Application No. 2019-164417, dated Oct. 6, 2020, 8 pages.
"Foreign Office Action", EP Application No. 19199457.3, dated Dec. 3, 2020, 4 pages.

* cited by examiner

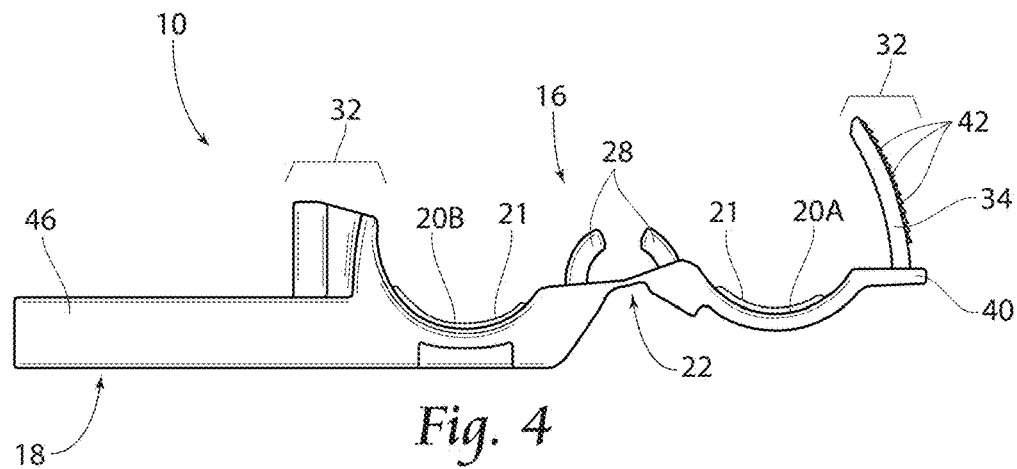
Fig. 4
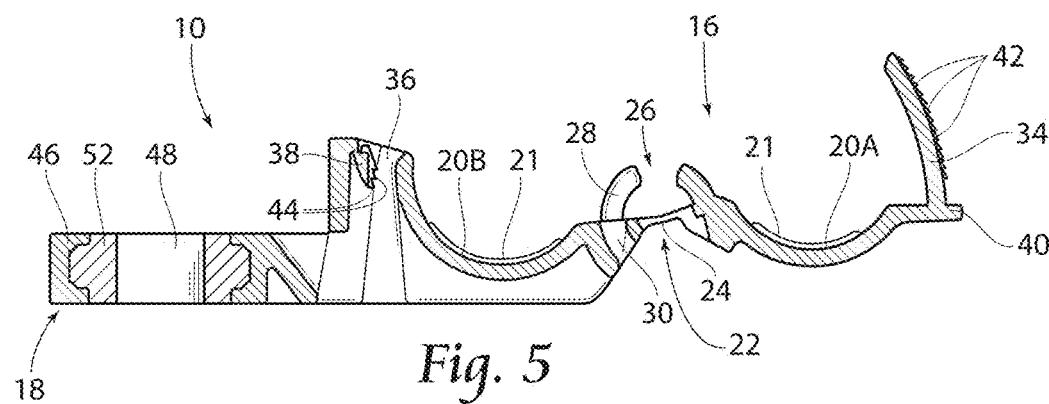
Fig. 5
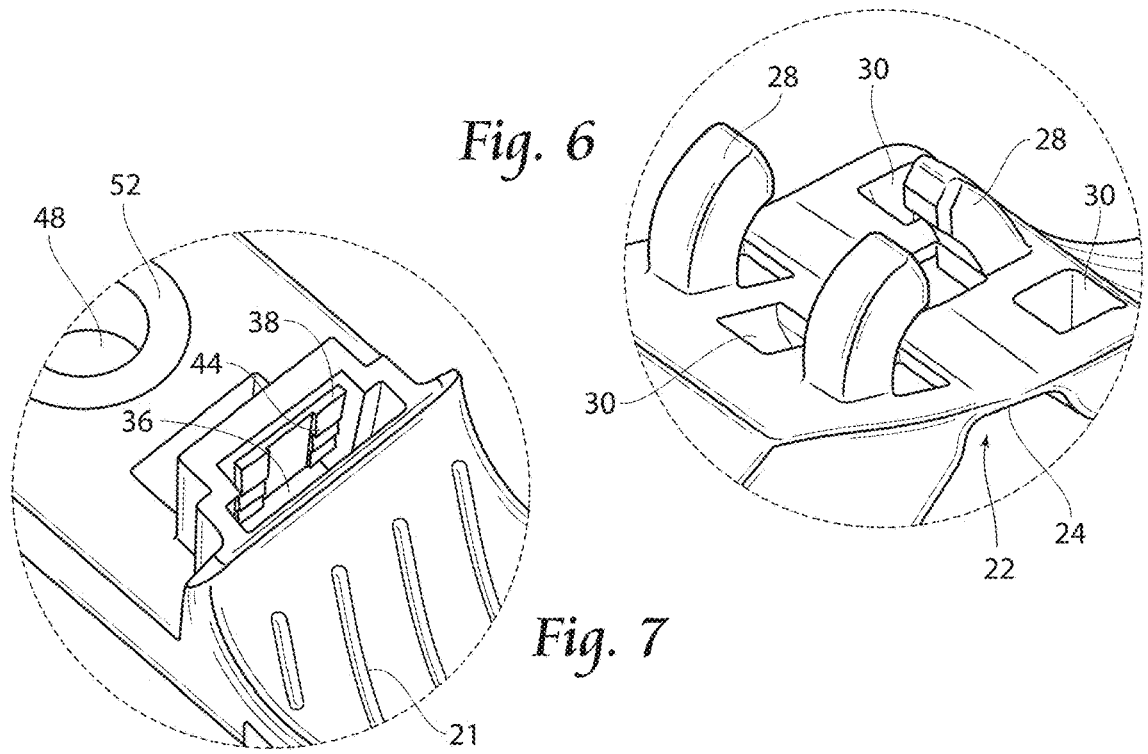
Fig. 6
Fig. 7

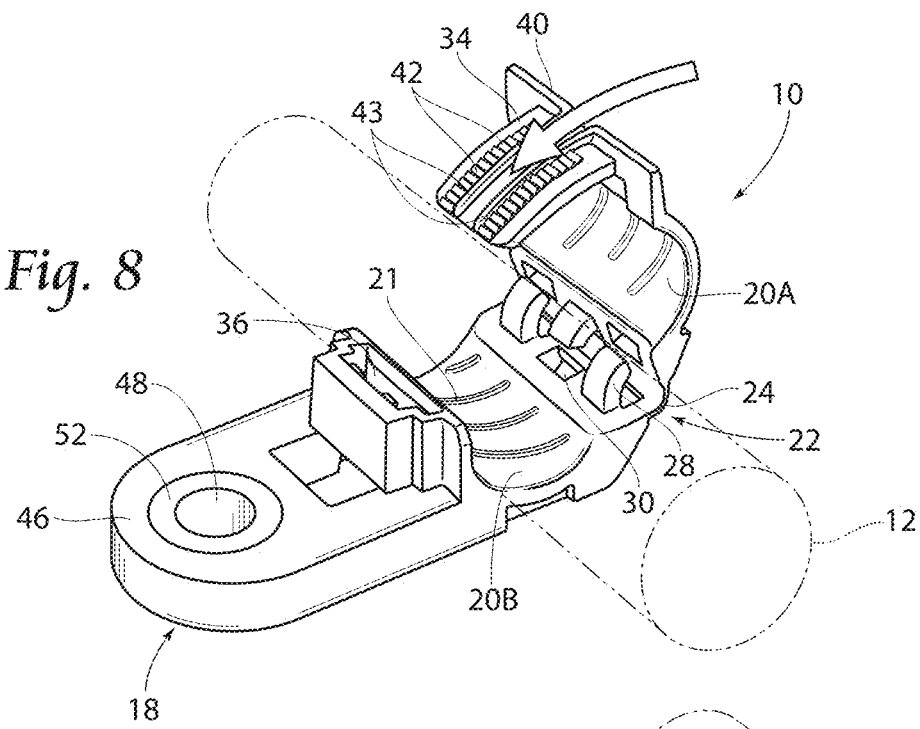
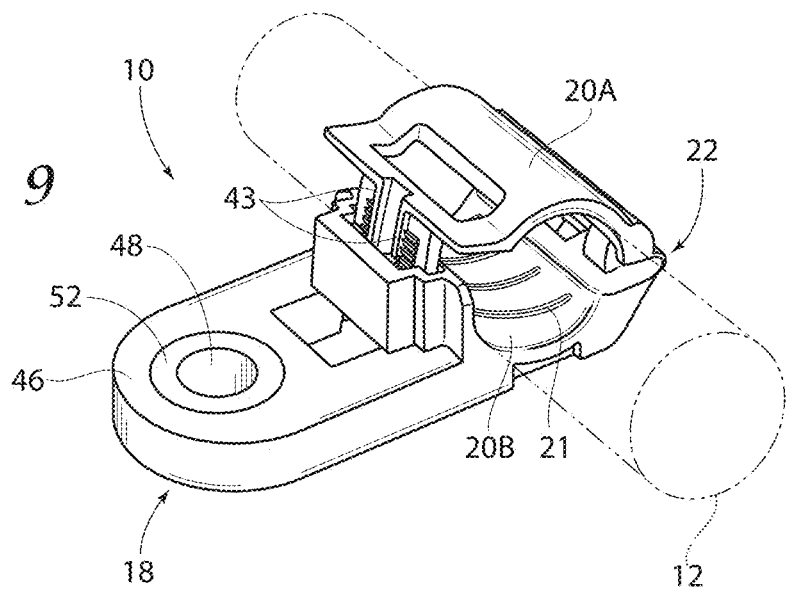
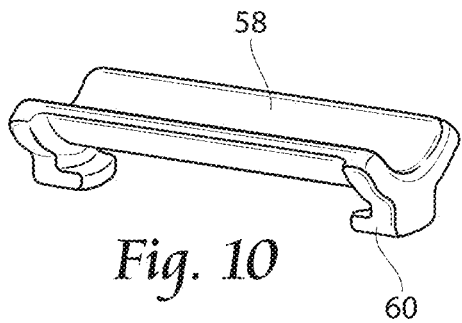
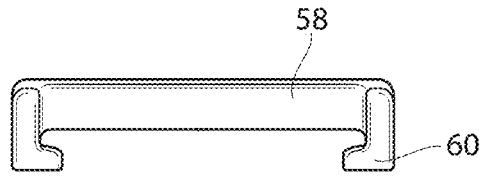

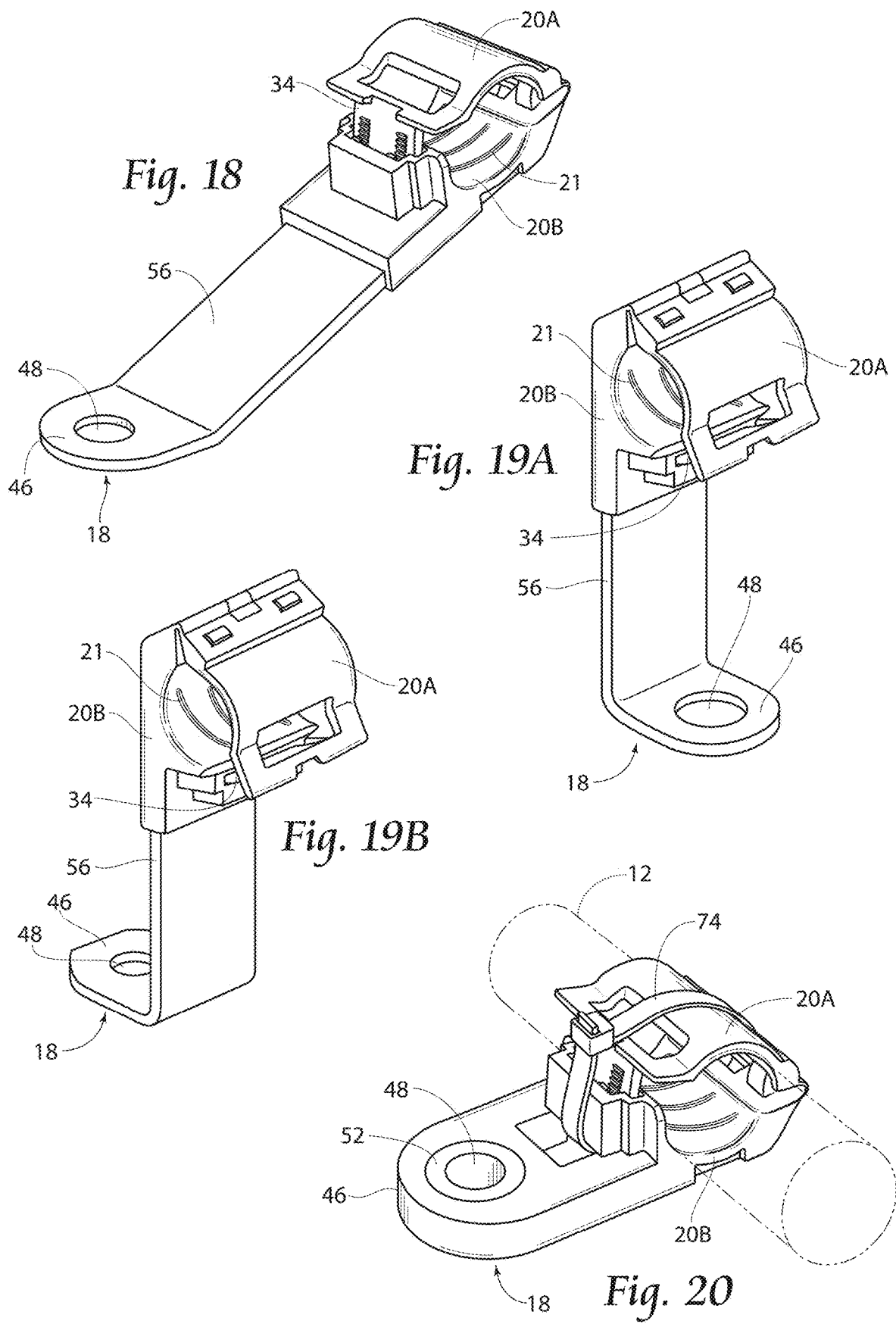

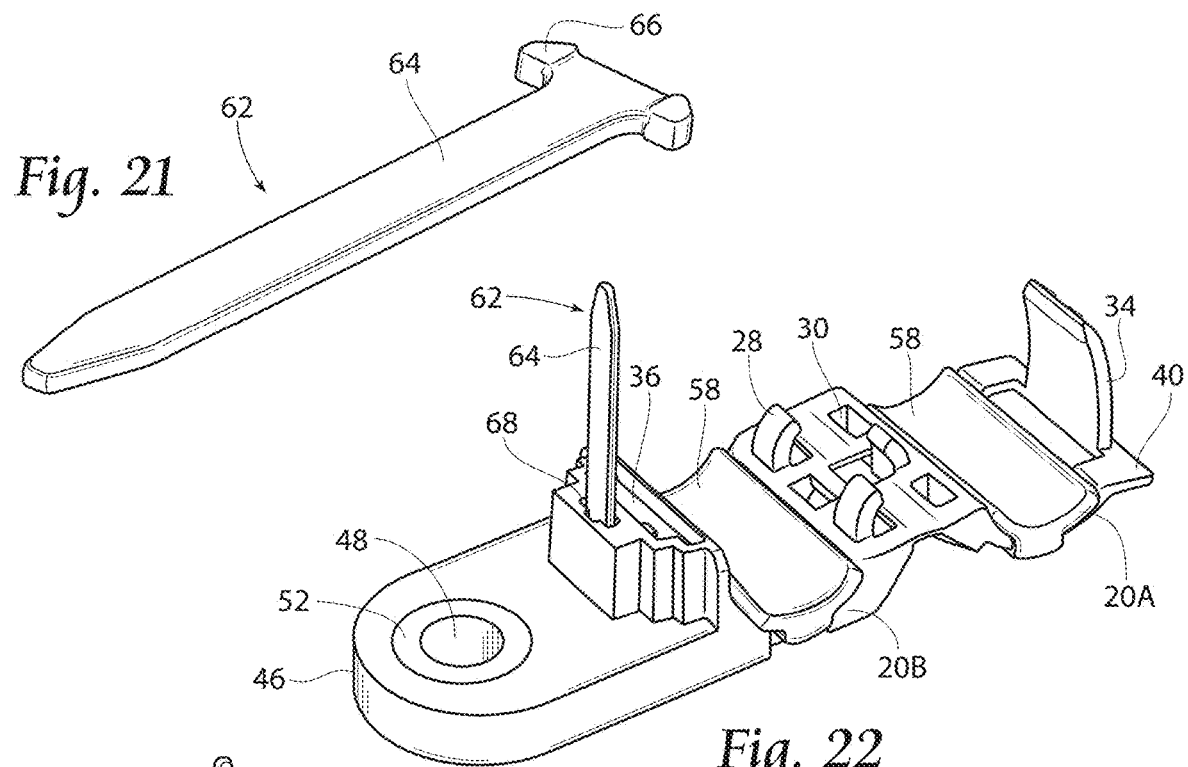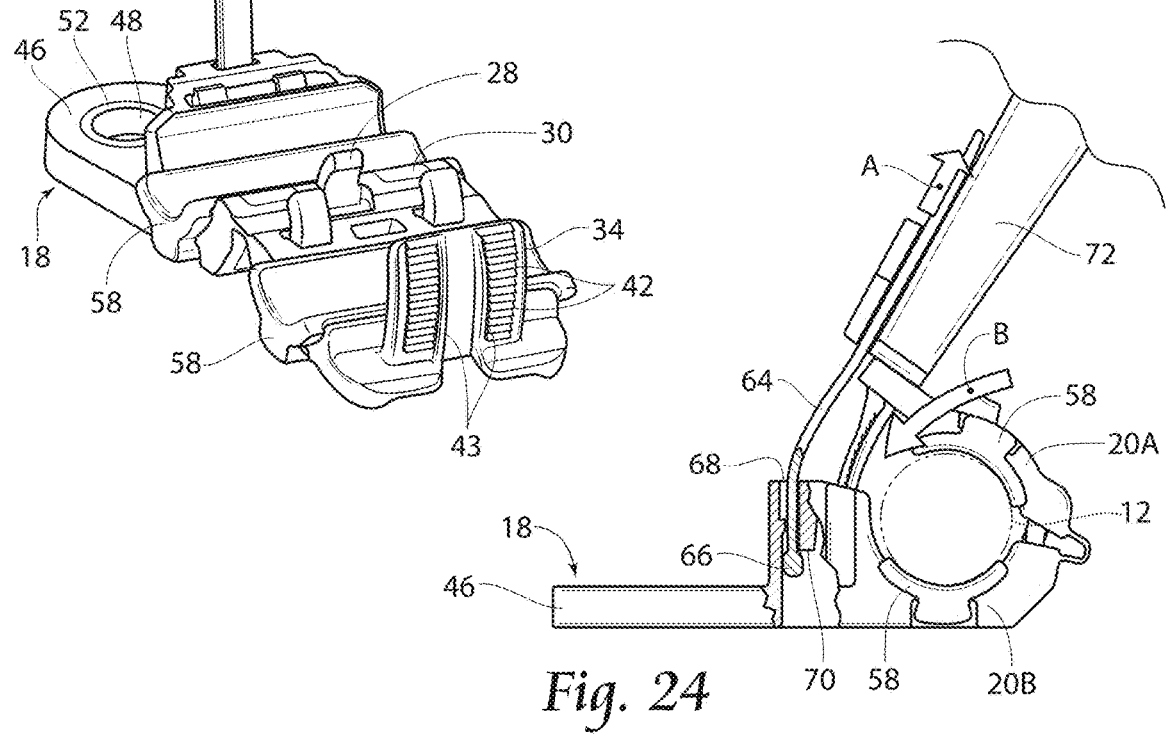

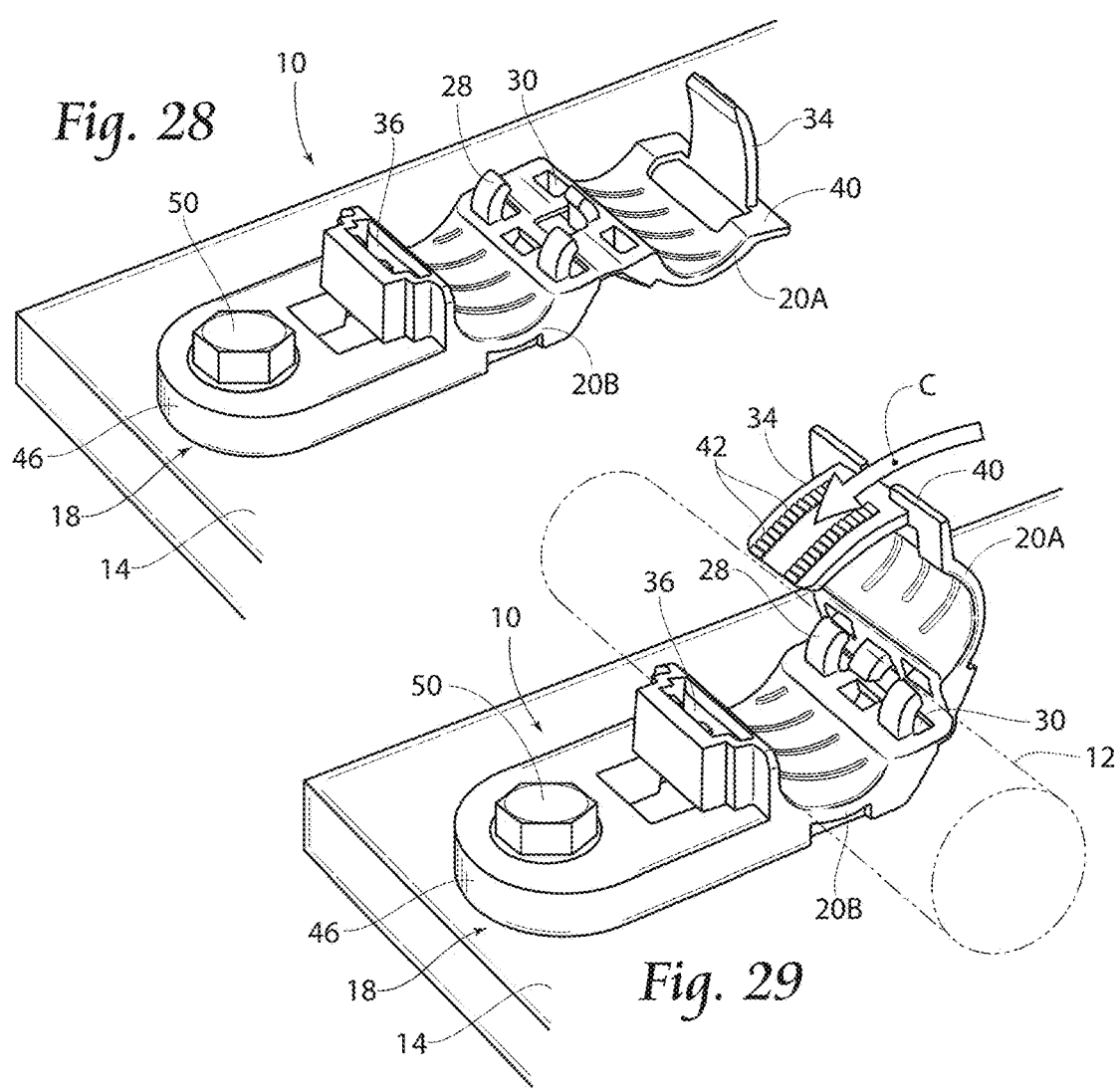
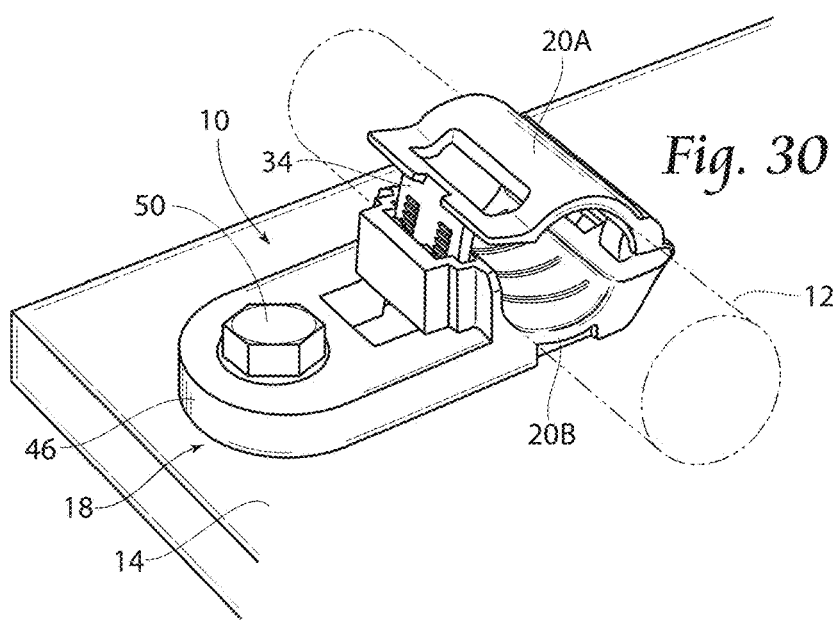

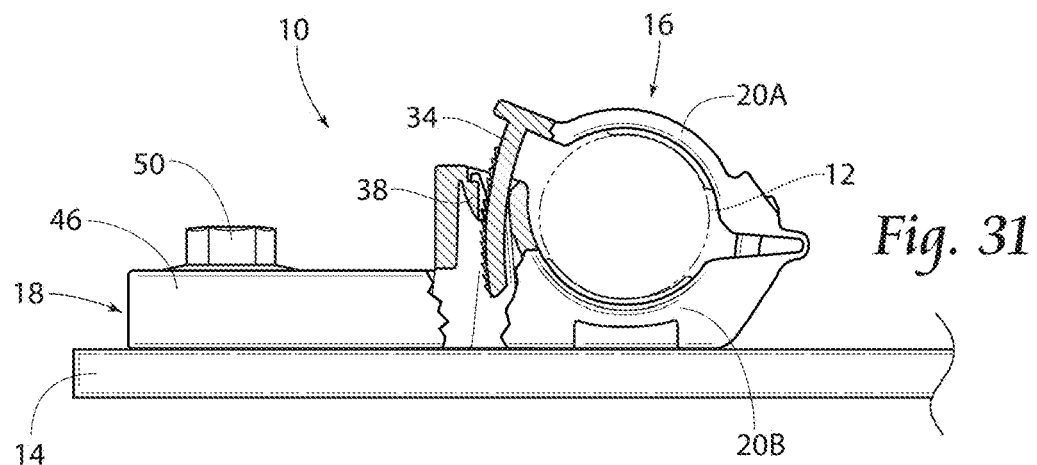
*Fig. 31*
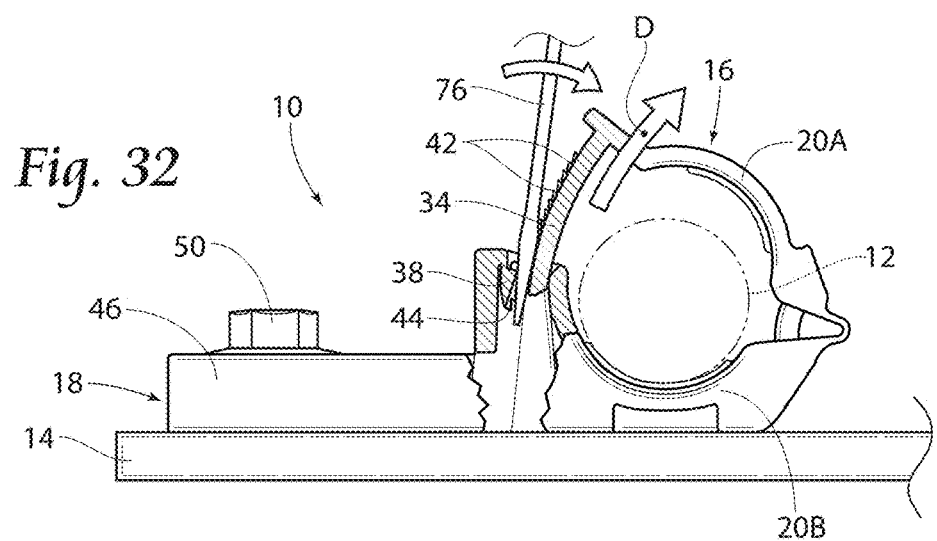
*Fig. 32*
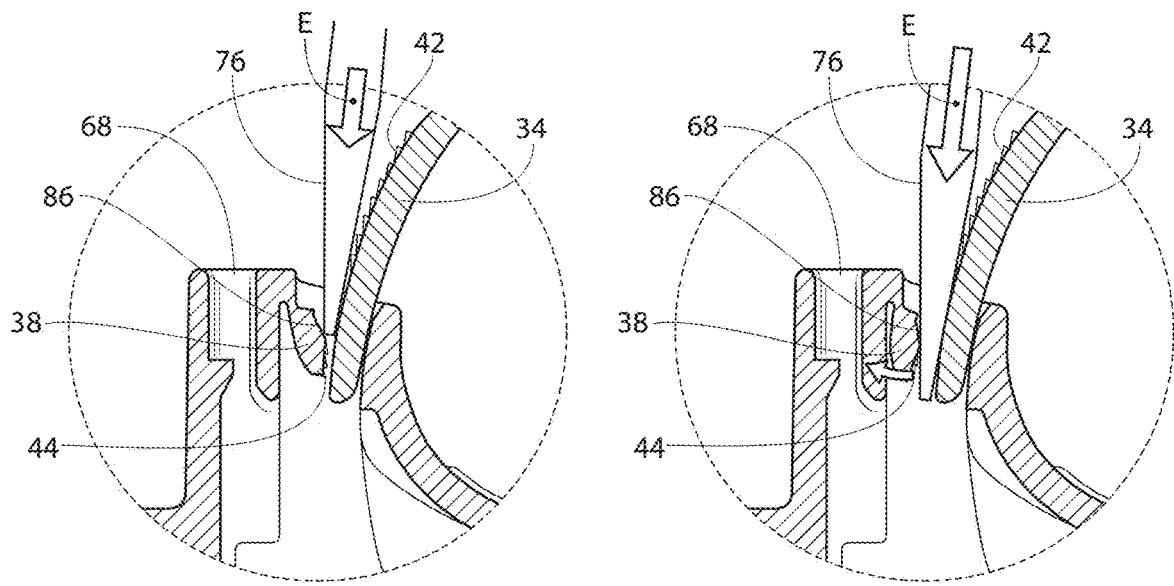
*Fig. 33A*  *Fig. 33B*

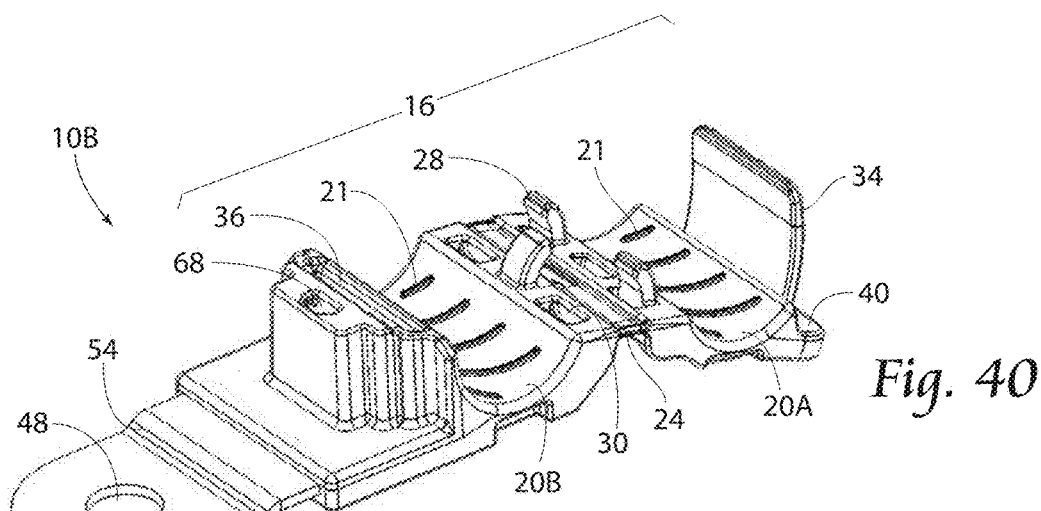
Fig. 40
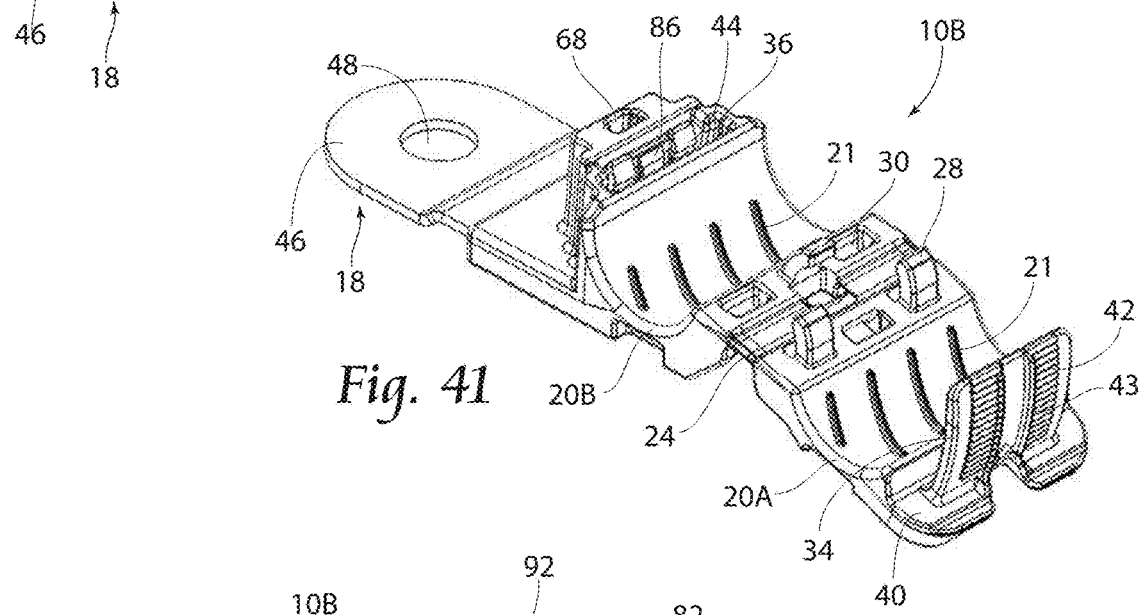
Fig. 41
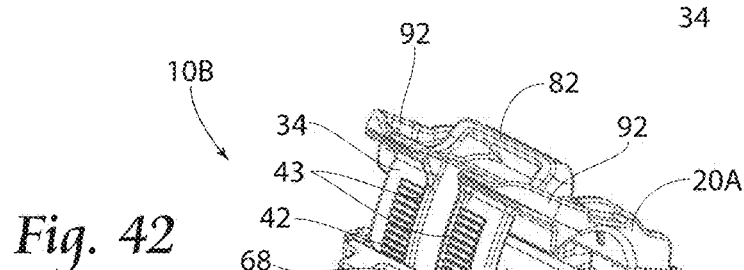
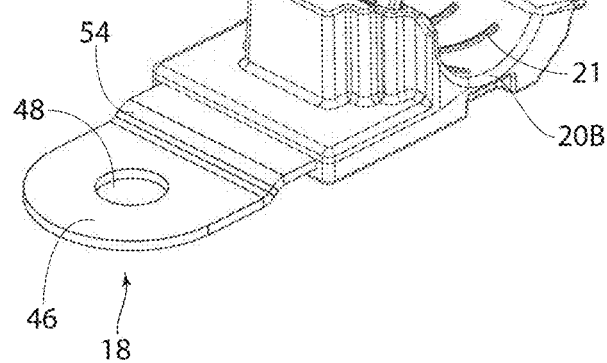
Fig. 42

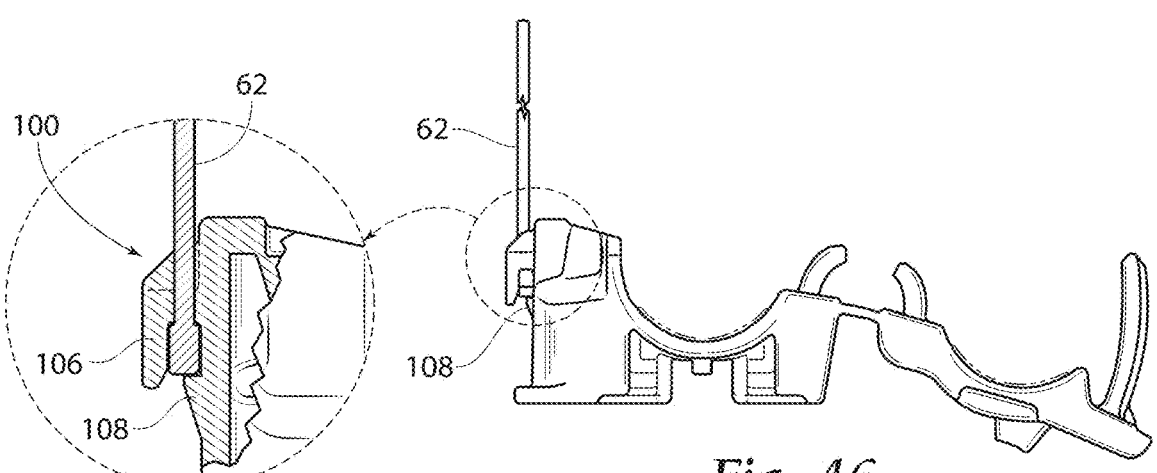
Fig. 46A
Fig. 46
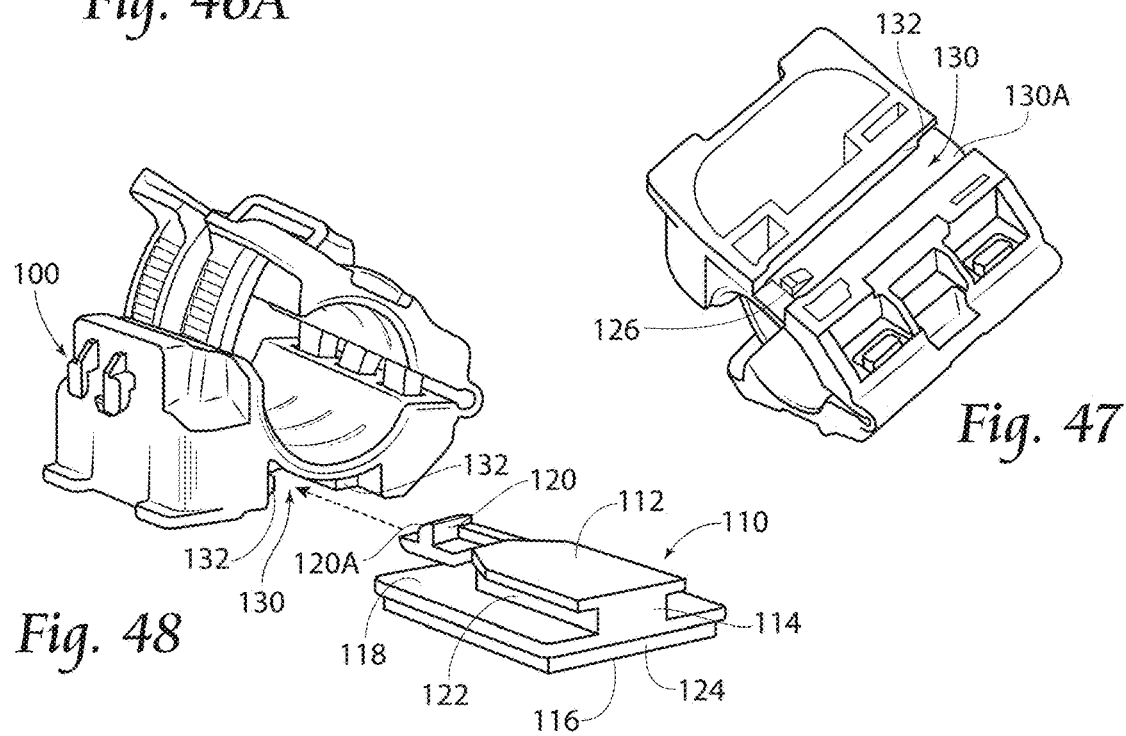
Fig. 47
Fig. 48
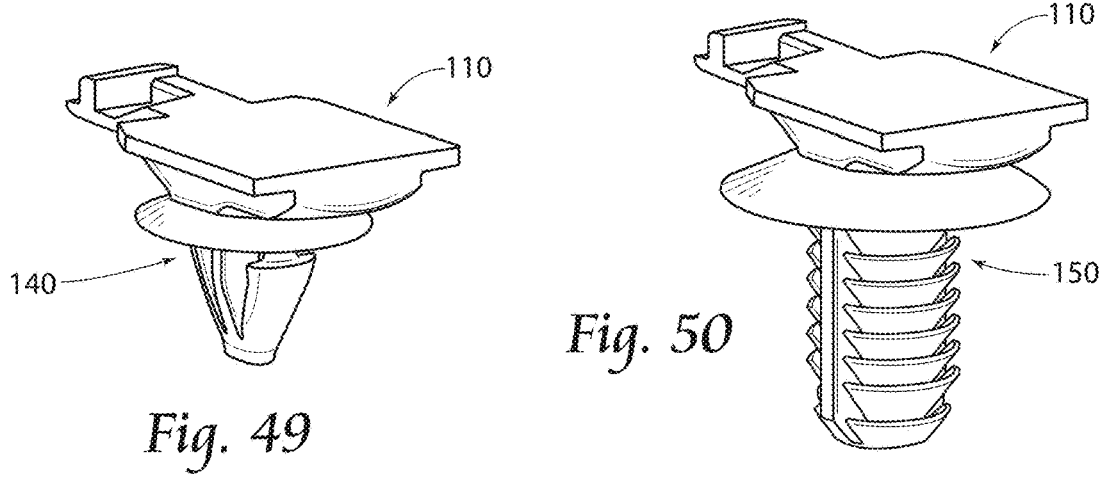
Fig. 49
Fig. 50

ADJUSTABLE P-CLAMP WITH MULTIPLE MOUNTING OPTIONS

CROSS-REFERENCE TO RELATED APPLICATIONS

This application is a divisional application of U.S. application Ser. No. 16/147,668, filed Sep. 29, 2018, which is a continuation-in-part application and claims benefit under 35 U.S.C. § 120 of U.S. patent application Ser. No. 15/423,419, filed Feb. 2, 2017, now U.S. Pat. No. 10,119,631, which claimed priority under 35 U.S.C. § 119(e) of U.S. Provisional Patent Application No. 62/291,965, filed on Feb. 5, 2016, the entire disclosure of each of which are hereby incorporated herein by reference.

TECHNICAL FIELD OF INVENTION

The present invention relates generally to retaining mechanisms. Particularly, the present invention is directed to an offset mounted clamp whereby an elongate bundle is secured and offset a distance from the mounting hole.

BRIEF DESCRIPTION OF THE DRAWINGS

The present invention will now be described, by way of example with reference to the accompanying drawings, in which:

FIG. 4 is a side elevation view of the adjustable P-clamp shown in FIGS. 2 and 3 according to an embodiment of the invention;

FIG. 5 is a cross section view of the adjustable P-clamp illustrated in FIGS. 2 through 4 and taken along lines 5-5 of FIG. 3 according to an embodiment of the invention;

FIG. 6 is a fragmentary enlarged view of the adjustable P-clamp illustrated in FIG. 2 through 5 and showing the hinge portion according to an embodiment of the invention;

FIG. 7 is a fragmentary enlarged view of the clamp illustrated in FIG. 2 through 5 and showing the locking pawls according to an embodiment of the invention;

FIG. 8 is a view similar to that of FIG. 2, but showing the clamp being positioned for fastening around an elongate object according to an embodiment of the invention;

FIG. 9 is a view similar to that of FIG. 8, but showing the clamp fastened around an elongate object according to an embodiment of the invention;

FIG. 10 is a perspective view of a flexible cradle insert according to an embodiment of the invention;

FIG. 11 is a side view of the insert illustrated in FIG. 10 according to an embodiment of the invention;

FIG. 18 is a perspective view of an assembly, similar to that shown in FIG. 17, but showing a fastening tab having an extended and angled portion according to an embodiment of the invention;

FIG. 19A is a perspective view of an assembly, similar to that shown in FIGS. 15, 17, and 18, but showing the fastening tab having an extended arm portion and an angled portion extending at a 90° angle in a first direction according to an embodiment of the invention;

FIG. 19B is a perspective view of an assembly, similar to that shown in FIGS. 15, 17, and 18, but showing the fastening tab having an extended arm portion and an angled portion extending at a 90° angle in a second direction according to an embodiment of the invention;

FIG. 20 is a view similar to that of FIG. 9, but showing a cable tie further securing the clamp in a closed position according to an embodiment of the invention;

FIG. 21 is a perspective view of a tension tab for use with the present invention according to an embodiment of the invention;

FIG. 22 is a view similar to that of FIG. 12, but showing a tension tab mount and a tension tab in place for use according to an embodiment of the invention;

FIG. 23 is a front perspective view of the adjustable P-clamp and tension tab illustrated in FIG. 22 and showing an elongate groove to guide the tension tab according to an embodiment of the invention;

FIG. 24 is a partial cut away side view of the assembly and tension tab illustrated in FIGS. 12 and 22, but showing the tension tab being tightened by a hand held device according to an embodiment of the invention;

FIG. 28 is a view similar to that of FIG. 27, but showing the adjustable P-clamp secured to a support surface and ready to receive an elongate object according to an embodiment of the invention;

FIG. 29 is a view similar to that of FIGS. 27 and 28 but showing the adjustable P-clamp secured to a support surface and the P-clamp being positioned for fastening around an elongate object according to an embodiment of the invention;

FIG. 30 is a view similar to that of FIGS. 27 through 29, but showing the P-clamp fastened around an elongate object according to an embodiment of the invention;

FIG. 31 is a partially cut away side elevation view of the adjustable P-clamp illustrated in FIG. 30 and showing a locking mechanism securing the P-clamp around an elongate object FIG. 32 is a view similar to that of FIG. 31 but showing a tool releasing the locking mechanism to open the P-clamp according to an embodiment of the invention;

FIGS. 33A and 33B are enlarged views showing a portion of FIG. 32 with a tool releasing the locking mechanism to open the P-clamp according to an embodiment of the invention;

FIG. 40 is a is a perspective view of an assembly, similar to that of FIG. 2, but having a metal fastening tab in combination with a tension tab aperture according to an embodiment of the invention;

FIG. 41 is another perspective view of the adjustable P-clamp illustrated in FIG. 40 according to an embodiment of the invention;

FIG. 42 is another perspective view of the adjustable P-clamp illustrated in FIGS. 40 and 41, but showing the P-clamp in a closed position according to an embodiment of the invention;

FIG. 46 is a side view showing a tension tab lock and tension tab illustrated in FIG. 45 according to an embodiment of the invention;

FIG. 46A is an enlarged view showing a portion of FIG. 46 with a tension tab lock and tension tab according to an embodiment of the invention;

FIG. 47 is a bottom perspective view of FIG. 45 showing a mounting insert channel according to an embodiment of the invention;

FIG. 48 is a perspective view showing an assembly as illustrated in FIGS. 45 and 46, but showing the mounting insert as it is to be positioned in the insert channel according to an embodiment of the invention;

FIG. 49 is a perspective view of a variation of the mounting insert as illustrated in FIG. 48, configured with a mounting arrowhead according to an embodiment of the invention;

FIG. 50 is a perspective view of a variation of the mounting insert as illustrated in FIG. 48, configured with a mounting fir tree according to an embodiment of the invention;

DETAILED DESCRIPTION

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Figure 27:
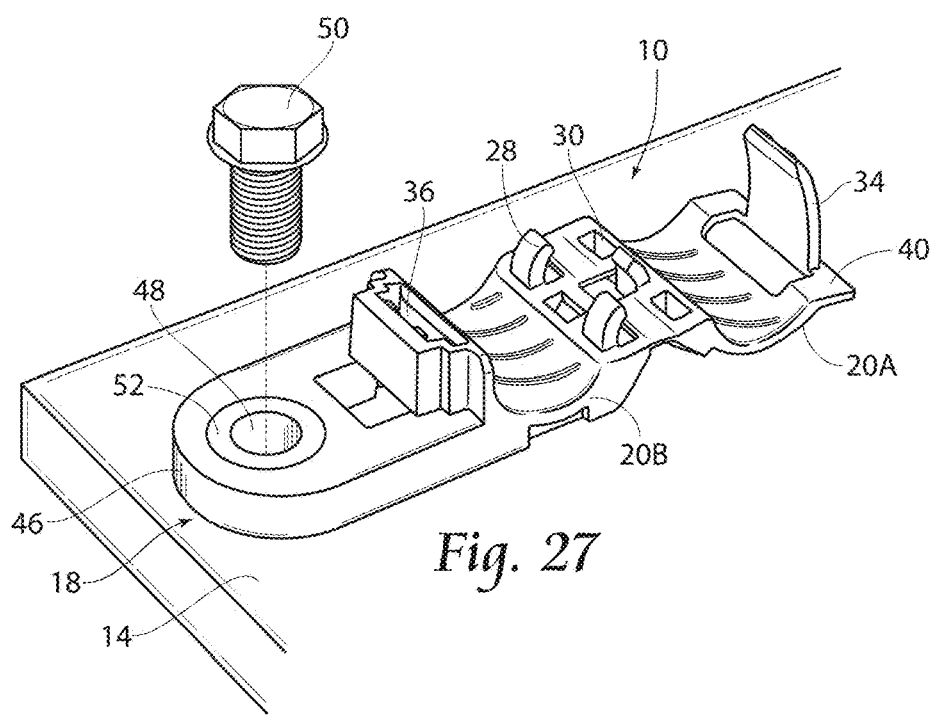
FIG. 27 is a perspective view of an assembly similar to that illustrated in FIG. 2, but showing a bolt fastening the adjustable P-clamp to a support surface according to an embodiment of the invention.

Referring to the drawings and in particular to FIGS. 2 through 9, inclusive, a non-limiting example of a device 10 that is configured to adjustably attach an elongate item to a support structure is shown. The device 10 very closely resembles a "P-clamp" and is hereinafter referred to as an adjustable P-clamp 10. The adjustable P-clamp 10 functions to secure elongate items, such as wires, cables and the like into bundles 12, shown in phantom lines, and to further secure the bundles 12 to an adjacent support structure 14, see FIG. 27 for an example. It will be apparent that the bundle 12 may comprise a single object or several objects, such as wires, conduits, or cables that are flexible or rigid, hot or cold, or fluid transporting hoses or tubes, fiber optics, conduits, plant vines, etc. Some elongate items may also be contained within the bore of a conventional tubular conduit. The adjustable P-clamp 10 is particularly well suited for use in applications requiring releasable clamping while the adjustable P-clamp 10 is attached to a support structure 14.

Figure 1:
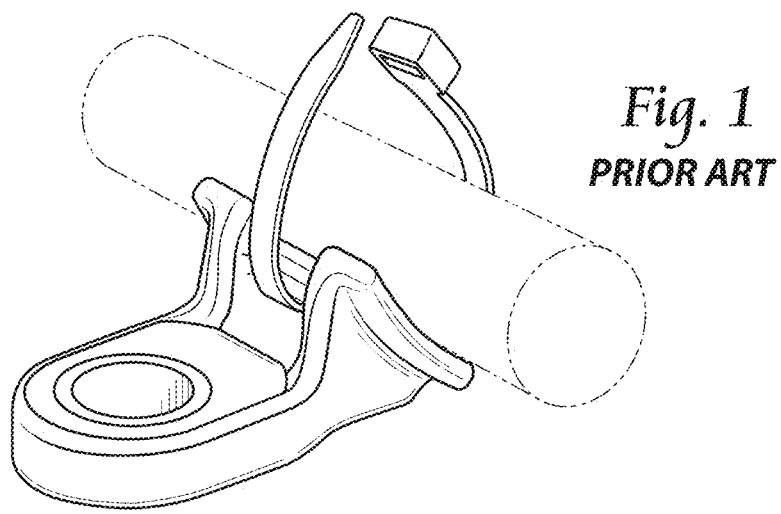
FIG. 1 is a perspective view of a P-clamp according to the prior art.
Figure 2:
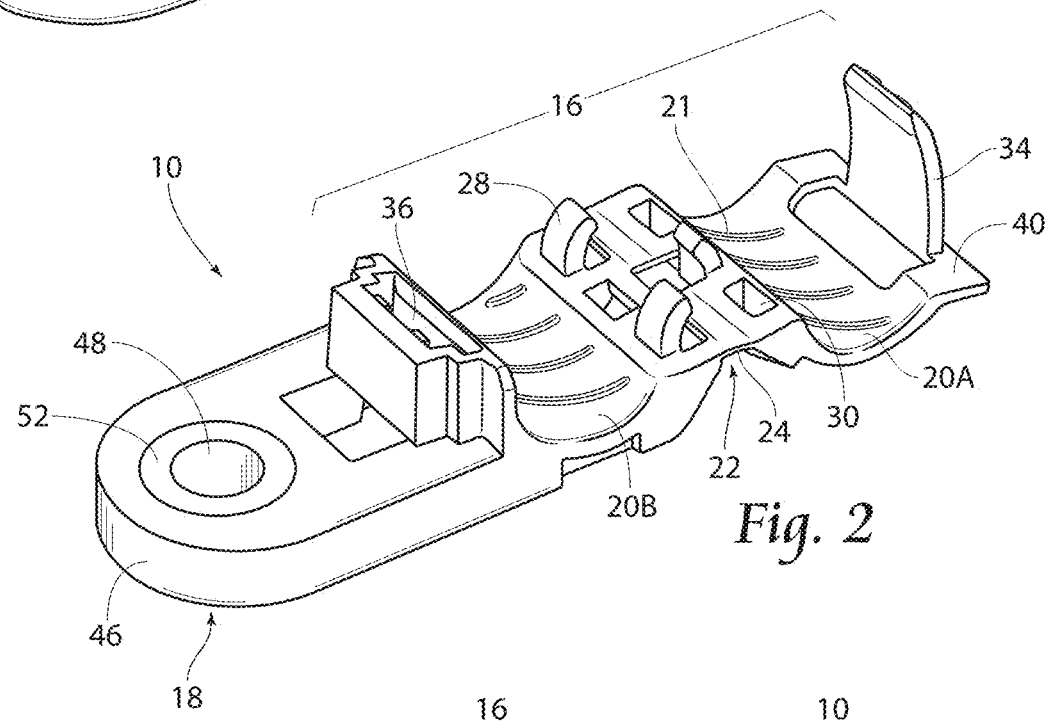
FIG. 2 is a perspective view of an adjustable P-clamp according to an embodiment of the invention.
Figure 3:
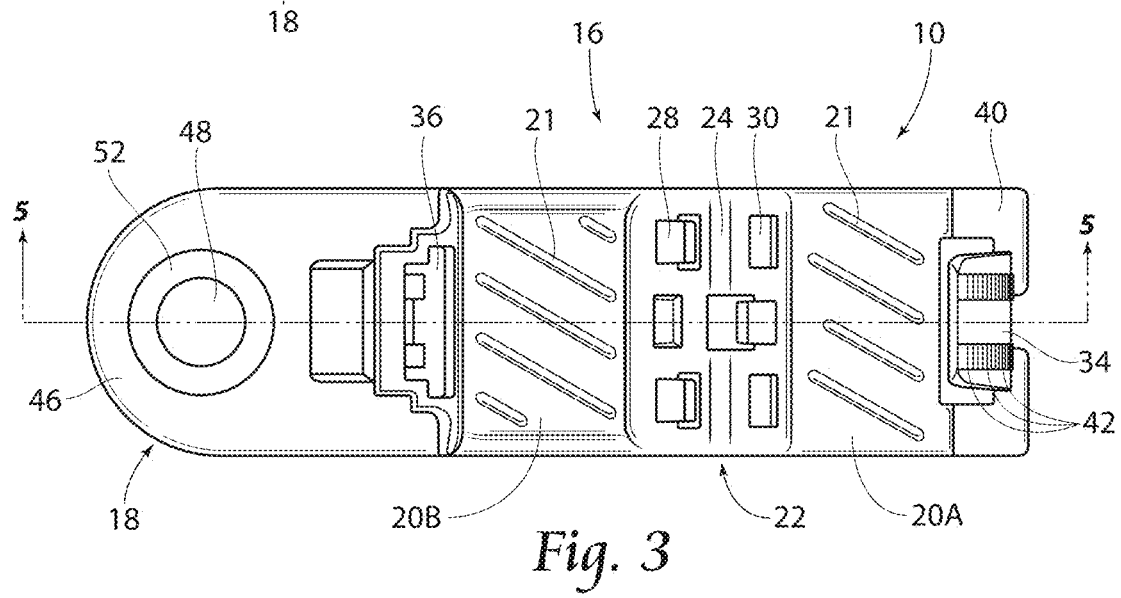
FIG. 3 is a top view of the adjustable P-clamp illustrated in FIG. 2 according to an embodiment of the invention.
Figure 12:
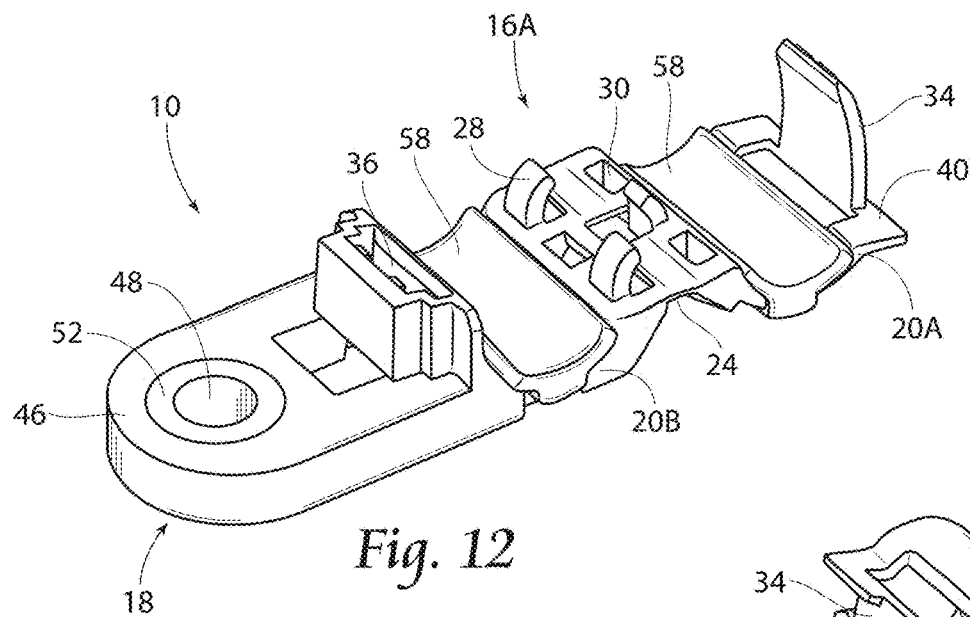
FIG. 12 is a perspective view of an assembly, similar to that of FIG. 2, but showing flexible cradle inserts in place on the clamping portion according to an embodiment of the invention.

As illustrated in the view of FIG. 2, the adjustable P-clamp 10 includes two principal components, namely an integrally formed clamp member 16 and a mounting element 18. The clamp members 16A, 16B define a pair of substantially symmetrical, arcuately shaped profiles 20A, 20B, hereinafter referred to as the arcuate profiles, 20A, 20B. The arcuate profiles 20A, 20B are shaped and dimensioned to encircle an elongate element, such as a bundle 12 and are joined by a hinge mechanism 22. The arcuate profiles 20A, 20B may further define ridges 21 projecting from the arcuate profiles 20A, 20B. The ridges 21 aid in securing a bundle 12 within the clamp member 16 and help prevent unwanted rotation of the bundle 12 during vibration or other movement of the adjustable P-clamp 10. Alternatively, the clamp members 16A, 16B may include a cradle member 58, as will be discussed with reference to FIGS. 10 through 12. As may be seen in FIG. 4, the hinge mechanism 22 may include an area of reduced thickness 24 which allows the hinge mechanism 22 to flex or bend freely during the installation and securing of a bundle 12. This type of hinge mechanism may be referred to as a living hinge. Alternative embodiments may be envisioned using other types of hinge mechanisms, such as a piano hinge, a butt hinge, etc. The hinge mechanism provides the benefit of maintaining alignment of the arcuate tongue 34 with the slot opening 36 throughout the process of closing the first clamp member 16A around the bundle 12.

With specific reference to FIGS. 5 and 6, it may be seen that the hinge mechanism 22 may also include a hinge interlocking mechanism 26. As shown, the interlocking mechanism 26 comprises an arcuate projection 28 that is configured to be received into a corresponding channel 30. When the clamp member 16 is engaged, and the clamp members 16A, 16B are closed around the bundle 12, as will be described, the interaction of the interlocking arcuate projection 28 in the channel 30 provides a secondary retention across the hinge which would be required in the unlikely event the area of reduced thickness in the hinge mechanism 22 would fail, due to cracking or other failure, thereby retaining the clamp members 16A, 16B in a closed position should the area of reduced thickness 24 fail, due to cracking or other loss of function. The hinge interlocking mechanism 26 may not be required, but provides backup retention and may be desired by consumers concerned about the robustness of plastic components.

As is illustrated in FIGS. 4, 5, 7, and 8, the clamp member 16 may be seen to further include a lock mechanism 32. The lock mechanism 32 is comprised of an arcuate tongue 34 and a slot opening 36 having an engaging pawl 38, particularly see FIGS. 5 and 7. As shown, a protruding beam 40 of the adjustable P-clamp 10 is positioned perpendicular to the arcuate tongue 34 and provides a platform or depression for an operators fingers or thumb press upon the first clamp member 16A when engaging the arcuate tongue 34 into the slot opening 36. The first clamp member 16A may include an extending arcuate tongue 34, with a slot opening 36 being positioned adjacent a second clamp member 16B. The arcuate tongue 34 is preferably molded with a plurality of serrations 42, which extend along the length of the arcuate tongue 34 and across the width of the arcuate tongue 34. The serrations 42 may be arranged in two parallel rows as shown. The arcuate tongue 34 is adapted to be received in a corresponding slot opening 36 adjacent the second arcuate profile 20B. As may be seen particularly in FIGS. 5 and 7, the engaging pawl 38 located in the slot opening 36 may include teeth 44 thereon. The teeth 44 may be arranged in two parallel rows to correspond to the width of the serrations 42 on the arcuate tongue 34. As illustrated, the serrations 42 engage the teeth 44 on the engaging pawl 38 when the arcuate tongue 34 is inserted into the slot opening 36 for retaining the bundle 12. As best shown in FIGS. 8 and 9, the arcuate tongue 34 may further include a pair of spaced apart serration rails 43. The pair of spaced apart serration rails 43 serve to protect the serrations 42 from damage from a release tool 76, see FIG. 32, should opening of the lock mechanism 32 be desired. The leading edge of the arcuate tongue 34 may be chamfered to provide the benefit of more easily inserting the arcuate tongue 34 into the slot opening 36.

The adjustable P-clamp 10 is adjustable to secure a range of various bundle diameters. Each succeeding engagement of the pawl teeth 44 to the serrations 42 reduces the circumferential diameter being formed by the adjustable P-clamp 10. Therefore, the adjustable P-clamp 10 is adjustable to various elongate bundle diameters within a predefined range designed for each size of adjustable P-clamp 10.

The protruding beam 40 of the adjustable P-clamp 10 is positioned perpendicular to the arcuate tongue 34 and provides a platform or depression for an operators fingers or thumb press upon the first clamp member 16A when engaging the arcuate tongue 34 into the slot opening 36.

With reference to FIGS. 10 and 11, a cradle member 58 may be seen. The cradle member 58 is adapted for engagement with respective clamp members 16A, 16B and to face a secured bundle 12 during use. The cradle member 58 may be fabricated of rubber or other high coefficient of friction material, to thereby provide a gripping force on a secured bundle 12 and to prevent unwanted rotation of a secured bundle 12 in applications during which vibration or other movement of the adjustable P-clamp 10 may occur. The cradle member 58 may include flanges 60 for securement to respective clamp members 16A, 16B.

As mentioned, a clamp assembly 10 according to the present invention further includes a mounting element 18 for securing clamp-restrained elongated articles or bundles 12 to a support structure 14. As seen in the figures, the mounting element 18 includes an extending mounting member 46 having a mounting aperture 48 therein. The mounting aperture 48 is preferably sized and dimensioned to receive an attachment feature, such as the bolt 50 shown, see FIGS. 27 through 38, although it is to be understood that other attachment feature may be used to attach the adjustable P-clamp 10 to a primary support structure 14, such as screws, or other known fastening devices. The mounting member 46 may be integrally formed with the adjustable P-clamp 10, as is shown in FIG. 2 through 13 or may be over molded with the adjustable P-clamp as depicted in FIGS. 14, 15, and 17 through 19A/B. The mounting member 46 may be fabricated of any suitably resilient material, including molded polymer, as seen in FIG. 2 and others, or metal as seen in FIG. 14 and others. A metal mounting member 46 can withstand high torque installation of fasteners, e.g. nuts, bolts, etc., and the over molded plastic second clamp member 16B provides some vibration dampening and/or isolation.

Figure 16A:
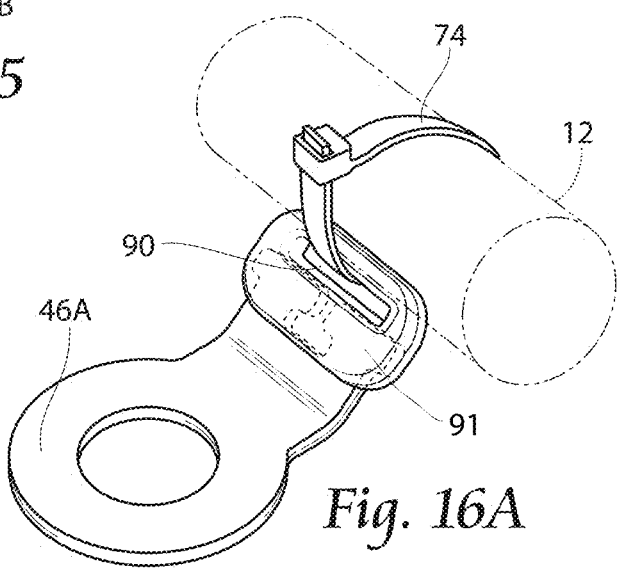
FIG. 16A is a perspective view of an alternative arrangement wherein a metal positioning bracket includes an over molded saddle or slot to receive a cable tie to secure an elongate object without use of a P-clamp according to an embodiment of the invention.
Figure 16B:
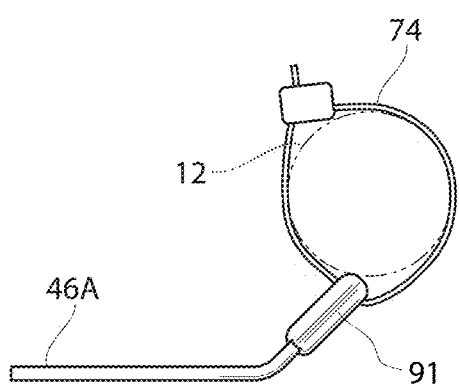
FIG. 16B is a side view of the device shown in FIG. 16A according to an embodiment of the invention.
Figure 17:
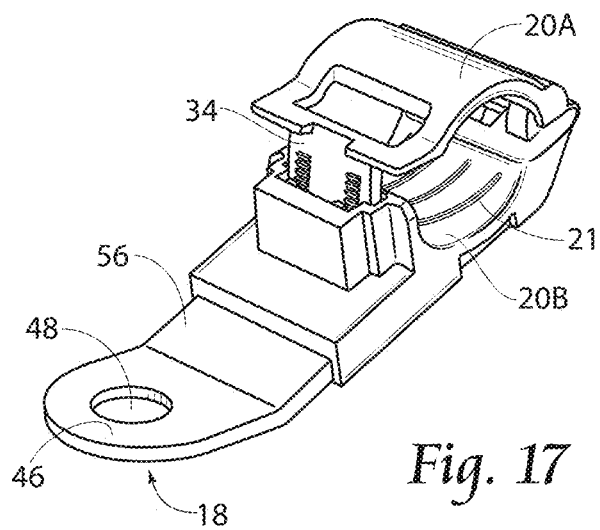
FIG. 17 is a perspective view of an assembly, similar to that shown in FIGS. 13, 14, and 15, but showing a fastening tab having an extended and angled portion according to an embodiment of the invention.

Moreover, the mounting aperture 48 may include an aperture reinforcement member 52, as is shown in FIGS. 2 through 12, or may lack such a feature as is shown in FIGS. 13 through 15 and FIGS. 17 through 19A/B as may be desired by the specific application. Further, a mounting member 46A may be used without a clamp member 16, as is shown in FIGS. 16A and 16B, wherein the mounting member 46A includes a tab slot 90 to receive a cable tie 74 to pass through and around the adjustable P-clamp and interact and further secure the adjustable P-clamp in a closed position. The mounting member 46A may be planar or angled to position the mounting member 46A at an optimal location and orientation for routing of the bundle 12. The mounting member 46A may be formed of metal and include a plastic over molded portion 91 surrounding the a tab slot 90 to prevent contact between the bundle 12 with a metal portion of the mounting member 46A. The mounting member 46A provides the benefit of retaining the bundle 12 without metal components being used to circumferentially compress and retain the bundle. No metal components are in direct contact with bundle. Metal in contact with bundles is known to adversely cause detrimental damage to bundles, e.g. harnesses, cables, hoses, etc.

As may be seen in FIGS. 13 through 19A/B, the mounting member 46, 46A may assume various shapes and configurations and remain within the scope of the present invention. As illustrated, the mounting member 46 may extend laterally in a generally planar arrangement, see FIG. 13, may include a stepped portion 54 (see FIG. 14), or may extend at an angle, see FIG. 15. Moreover, the mounting member 46 may include an extension portion 56, see FIGS. 17 and 18, having a predetermined length. The length of the extension portion 56 may vary according the requirements of a specific application. The extension portion 56 provides the benefit of positioning the clamp member 16 to extend, reach guide, and route the bundle 12 in applications where a mounting hole or treaded stud is not available in close proximity to the bundle 12.

Figure 13:
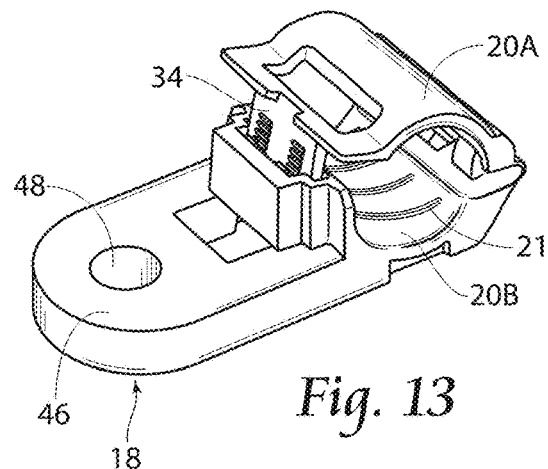
FIG. 13 is a perspective view of an assembly, similar to that shown in FIG. 9, but showing a fastening tab having a non-reinforced opening according to an embodiment of the invention.
Figure 14:
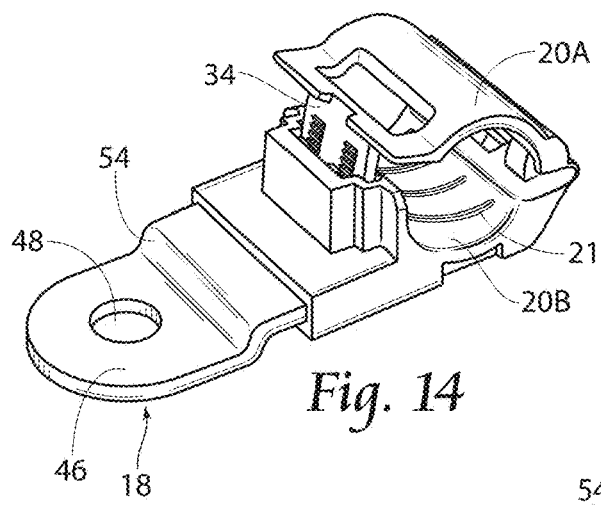
FIG. 14 is a perspective view of an assembly, similar to that shown in FIG. 13, but showing a metal fastening tab according to an embodiment of the invention.
Figure 14A:
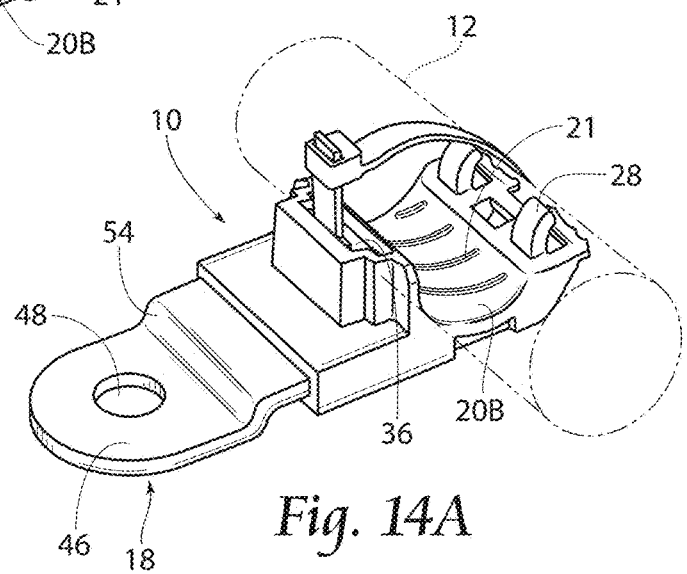
FIG. 14A is a perspective view of the adjustable P-clamp illustrated in FIG. 14, but showing a cable tie in use to secure an elongate object after clamp failure according to an embodiment of the invention.
Figure 15:
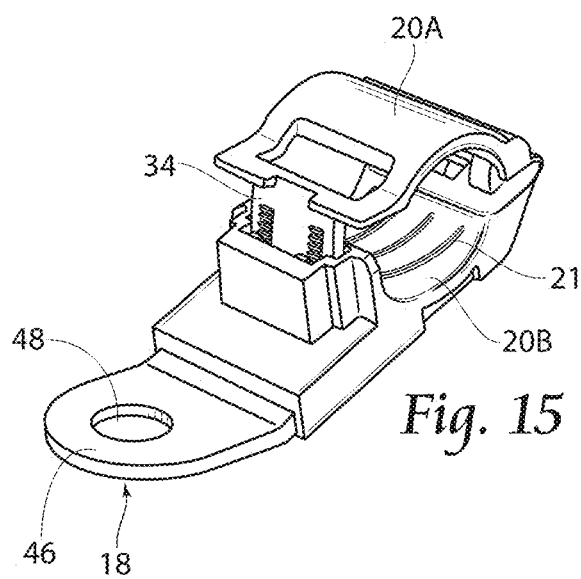
FIG. 15 is a perspective view of an assembly, similar to that shown in FIGS. 13 and 14, but showing a fastening tab having an angled portion according to an embodiment of the invention.

Moreover, the mounting member 46 may be integrally formed as a one piece construction with the adjustable P-clamp 10, as seen in FIG. 13, may be overmolded as is shown in FIGS. 14, and 17 through 19A/B, or may be a unitary piece without a clamp member 16 as shown in FIGS. 16A and 16B.

The wedge-shaped pawl may have two separate segmented rows of teeth with a large enough gap between the rows of teeth to allow a small screw driver to be inserted in between the rows of teeth for releasing engagement of the pawl. A complementary gap exists between the serrations on the tongue: One embodiment similarly segments the tongue serrations resulting in a similar gap that was discussed on the wedge shaped pawl. The resulting gap is in the center of the tongue to likewise allow the small screwdriver to be inserted in between serrations for release of adjustable P-clamp, unimpeded by the serrations, and being less likely to damage the serrations with the screwdriver during the release process. Another embodiment adds tall rails to the edges of the gap forming separation walls perpendicularly flanking the serrations zones, thereby creating a release channel for the screwdriver making it less likely to be able to damage the serrations with screwdriver during release of the adjustable P-clamp.

Thus the above mentioned features provide an easy to release bundle retention feature that allows the clamp to be reused and is attributed to the damage prevention features, i.e. a gap for unimpeded screwdriver entry and a channel to control screwdriver movement and inhibit screwdriver deflection.

With reference now to FIGS. 21 through 24, the present clamp assembly 10 may be seen in use in combination with a tension tab 62. A tension tab 62 for use with the present clamp assembly 10 may comprise an elongate strap portion 64 and a T-shaped head portion 66. A tension tab 62 may be used to aid a user in closing the clamp members 16A, 16B around an elongate member, such as a bundle or wires, cables, or tubes, hereinafter referred to as the elongate bundle 12, and to apply proper tension of the clamp members 16A, 16B around the bundle 12. In use, and as seen in FIG. 24, the tension tab 62 is inserted in a tension tab aperture 68 on the adjustable P-clamp 10. The -shaped head portion 66 is stopped against an abutment 70 in the tension tab aperture 68, while the strap portion 64 extends from the tension tab aperture 68, see FIG. 24. To close the clamp members 16A, 16B around the bundle 12, the user may press down on the first clamp member 16A to move the arcuate tongue 34 into the slot opening 36, or, when the tension tab 62 is used, the user may use a handheld tensioning and cutoff tool 72 to grasp the strap portion 64. When the tension tab 62 and the handheld tensioning and cutoff tool 72 are used as shown in FIG. 24, the handheld tensioning and cutoff tool 72 is actuated to pull the strap portion 64 in the direction of arrow A, while pushing against the first clamp member 16A in the direction of arrow B to thereby close the clamp members 16A, 16B with a predetermined tension selected on the handheld tensioning and cutoff tool 72. Once closed to the predetermined tension, the handheld tensioning and cutoff tool 72 may sever the excess portion of the strap portion 64. The present clamp assembly 10 may be further used on combination with a flexible cable tie 74, see FIG. 20, such as are widely used in other applications to secure elongate items, such as wires, cables, hoses and tubes, into compact, secure bundles, as will be discussed.

Figure 25:
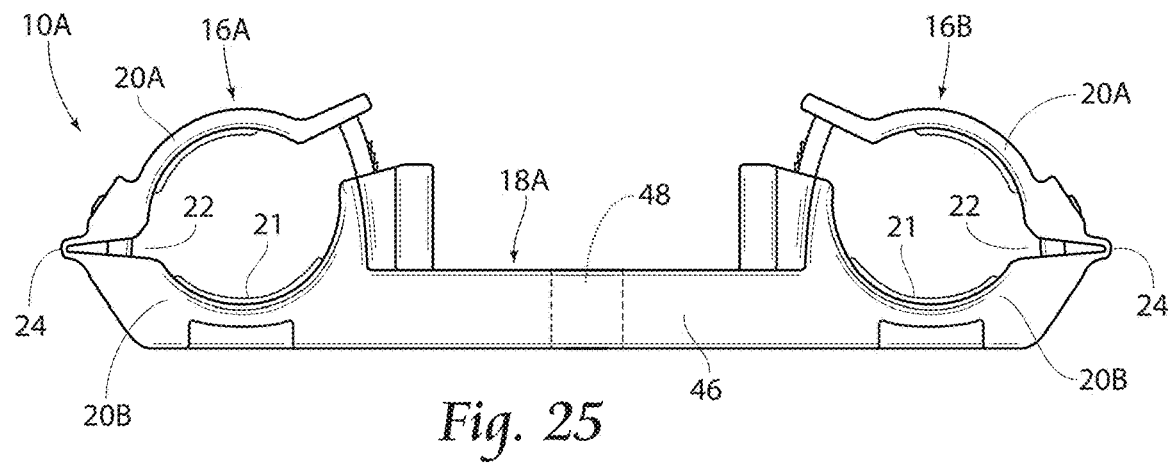
FIG. 25 is a side elevation view of another embodiment of an assembly and showing two P-clamps joined by a single fastening tab according to an embodiment of the invention.
Figure 26:
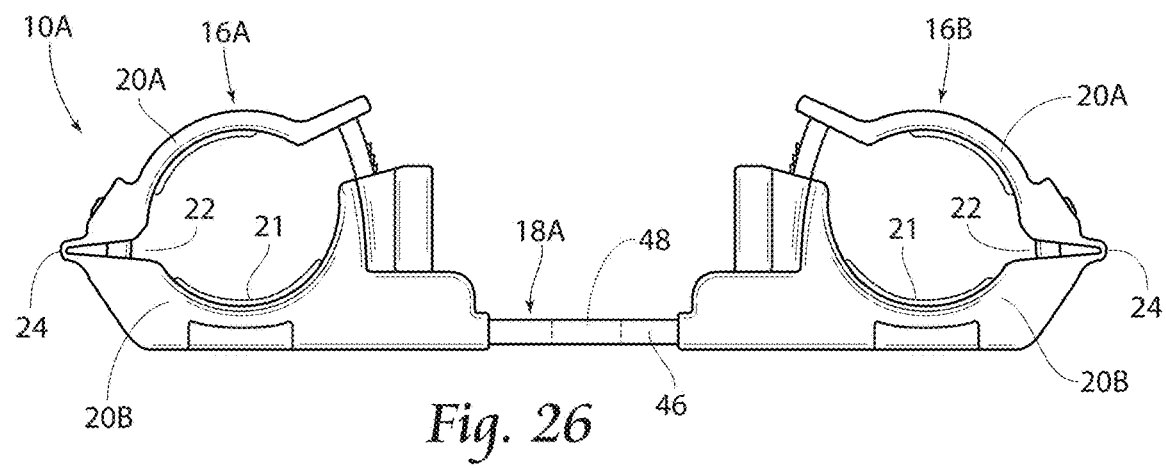
FIG. 26 is a view similar to that of FIG. 25 but showing two P-clamps joined by a metal fastening tab according to an embodiment of the invention.

The views of FIGS. 25 and 26 illustrate an alternative embodiment clamp assembly 10A, in which a pair of clamp members 16A, 16B may be laterally spaced apart and joined by a mounting element 18A. As in the previously described embodiment, the adjustable P-clamp 10A of these views includes two principal components, a pair of integrally formed clamp members 16A, 16B and a mounting element 18A. The clamp members 16A, 16B each include a pair of substantially symmetrical, arcuately shaped profiles 20A, 20B that are shaped and dimensioned to encircle the bundle 12 and are joined by a hinge mechanism 22. The arcuate profiles 20A, 20B may further include ridges 21 projecting from the arcuate profiles 20A, 20B or, alternatively, the clamp members 16A, 16B may include a cradle member 58, as described with reference to FIGS. 10 and 11. As in the previously described embodiment, the hinge mechanism 22 may include an area of reduced thickness 24 to allow the hinge mechanism 22 to move freely during the installation and securing of a bundle 12. The adjustable P-clamp 10A illustrated in these views further includes the hinge interlocking mechanism 26 previously discussed as comprises the arcuate projection 28 that is configured to be received into a corresponding channel 30 (not shown in these views). Moreover, the adjustable P-clamp 10A illustrated in FIGS. 25 and 26 includes a mounting element 18A for securing clamp-restrained elongated articles or bundles 12 to a support structure 14, see FIGS. 27 through 38. As in the previous embodiment, the mounting element 18A includes an extending mounting member 46 having a mounting aperture 48 therein which may or may not include an aperture reinforcement member 52. The mounting member 46 may be integrally formed with the adjustable P-clamp 10A, as is shown in FIG. 25 or may be over molded with the adjustable P-clamp 10A as depicted in FIG. 26.

A method of using the described clamp assembly 10 according to the present invention may be seen in FIGS. 27 through 33B. As is shown, the mounting element 18 of the adjustable P-clamp 10 is secured to a support structure 14 by way of the bolt 50 shown, although it is to be understood that other attachment feature may be used to attach the adjustable P-clamp 10 to a primary support structure 14, such as screws, or other known fastening devices. A bundle 12 is placed on arcuate profile 20B and clamp member 16A is moved in the direction of arrow C, see FIG. 29. As clamp member 16A moves around bundle 12, the arcuate tongue 34 and its serrations 42, are engaged by the engaging pawl 38 in the slot opening 36 until a proper tension is achieved and the bundle 12 is secured. In the event that release of the bundle 12 is desired, an elongate release tool 76 is inserted into the slot opening 36, as shown in FIGS. 32 through 33B. The release tool 76 biases the engaging pawl 38 such the teeth 44 on the engaging pawl 38 disengage from the serrations 42 of the arcuate tongue 34, and the arcuate tongue 34 may be released in the direction of arrow D, thereby opening the clamp member 16 and freeing the bundle 12. Moreover, the views of FIGS. 33A and 33B illustrate the engaging pawl 38 having a wedge release aid 86 to further aid a user in release of the arcuate tongue 34. As shown, a release tool 76 moves in the direction of arrow E and biases the wedge release aid 86 for release of the arcuate tongue 34 in the direction of arrow D, see FIG. 32.

Figure 34:
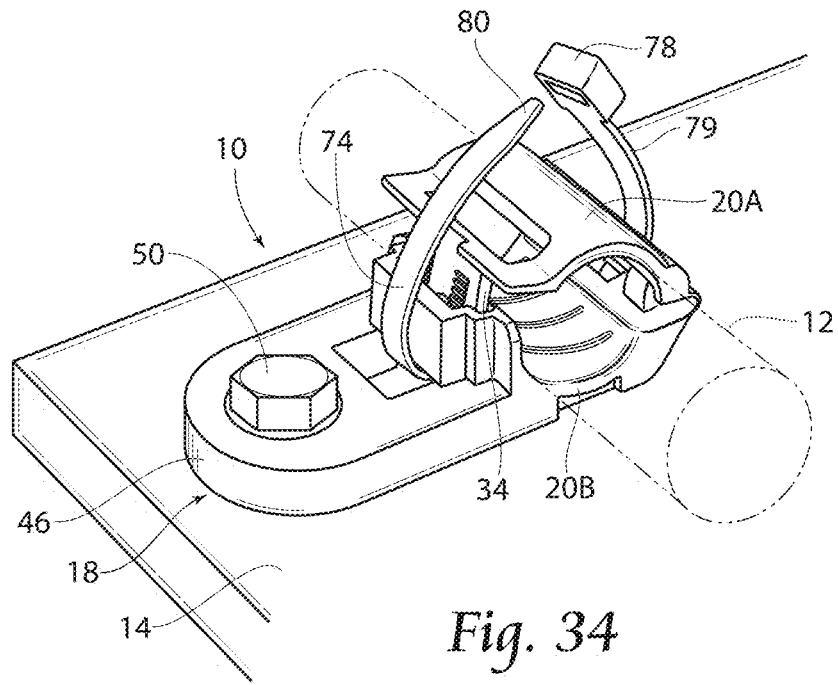
FIG. 34 is a view similar to that of FIG. 30, but showing a cable tie being positioned around the P-clamp according to an embodiment of the invention.
Figure 35:
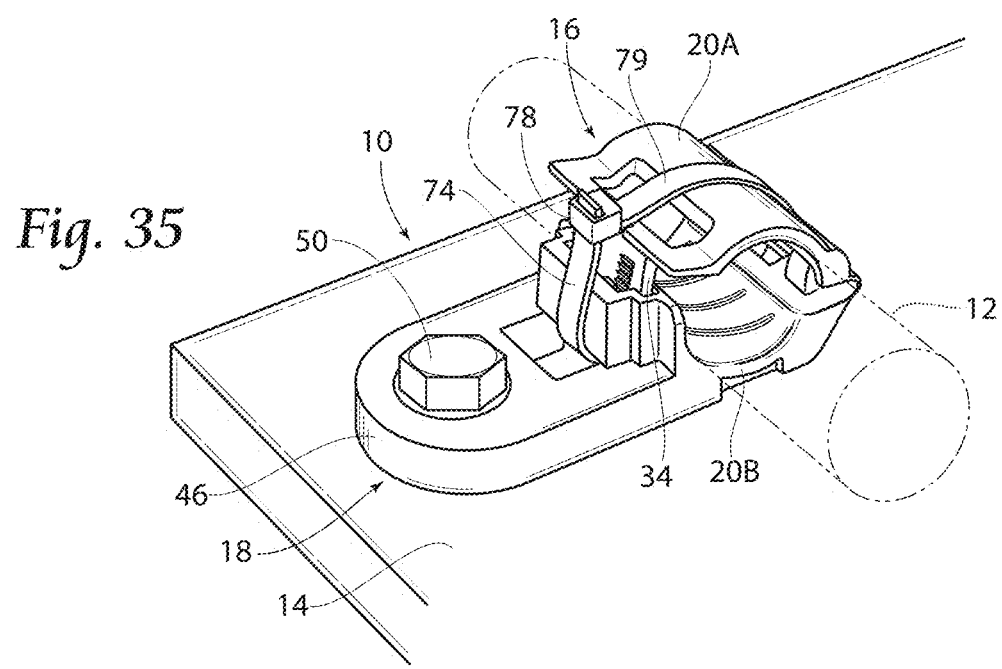
FIG. 35 is a view similar to that of FIG. 34, but showing a cable tie in place and securing the P-clamp around an elongate object according to an embodiment of the invention.

FIGS. 34 and 35 illustrate another method of using the described clamp assembly 10 according to the present invention. As is shown, and similar to the method of FIGS. 28 through 31, the mounting element 18 is secured to a support structure 14 by way of a bolt 50 or other suitable fastener. A bundle 12 is placed on arcuate profile 20B and clamp member 16A is moved as shown in FIG. 29 such that the arcuate tongue 34 and its serrations 42 are engaged by the engaging pawl 38 in the slot opening 36 until a proper tension is achieved and the bundle 12 is secured. The method shown in FIGS. 34 and 35 may include the further step of retaining the clamp member 16 with a cable tie 74. Typically, such cable tie 74 include a head 78 and a flexible strap 79, which terminates in a tail 80. In use, the cable tie 74 is inserted through the head 78 and then looped around the elongate item, in this use the clamp member 16. The tail 80 is then pulled tight to pull the strap 79 around the clamp member 16 to thereby secure the clamp member 16 in a closed position. A pawl mechanism (not shown) within the head 78 secures the strap 79 against withdrawal. The use of the cable tie 74 further secures the clamp member 16 in closed condition the event of a failure or other unwanted release of the clamp member 16, see FIGS. 35A and 35B.

Figure 35A:
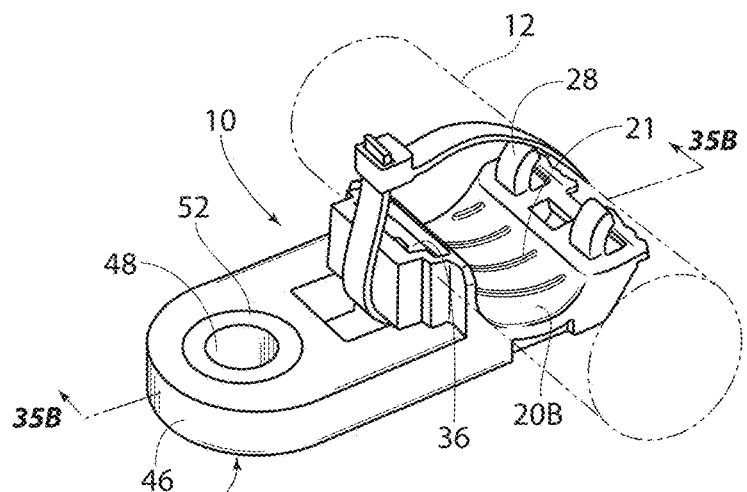
FIG. 35A is a perspective view of an assembly, similar to that shown in FIG. 35, but showing a cable tie in use to secure an elongate object during clamp failure according to an embodiment of the invention.
Figure 35B:
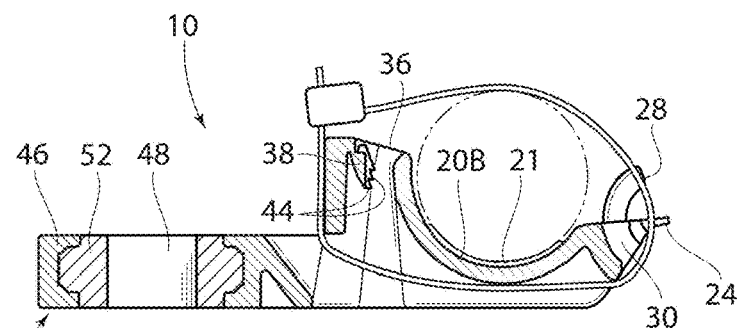
FIG. 35B is a cross section view of the adjustable P-clamp illustrated in FIG. 35A and taken along line 35B-35B thereof according to an embodiment of the invention.
Figure 36:
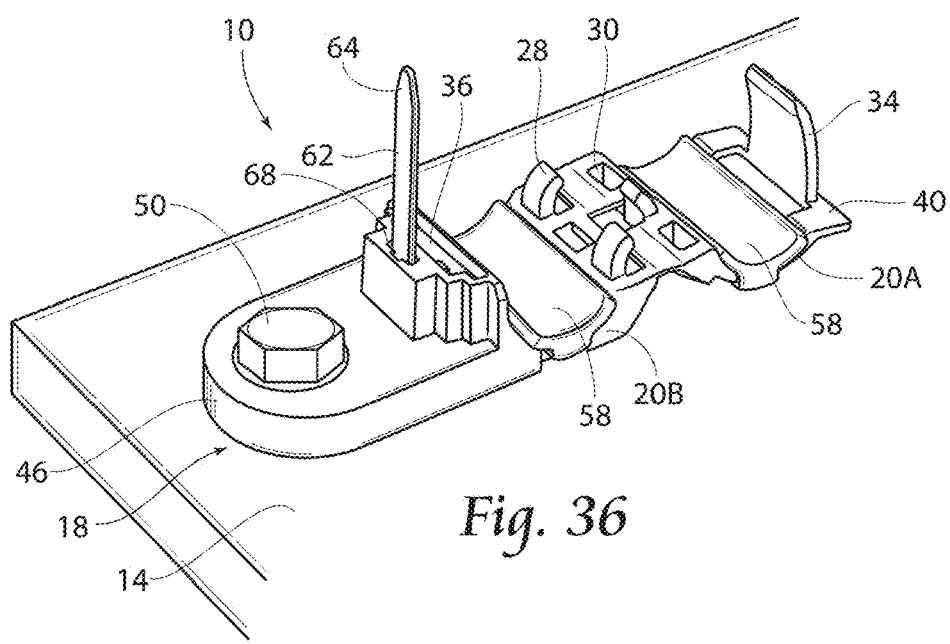
FIG. 36 is a view similar to that of FIG. 22, but showing the adjustable P-clamp secured to a support surface and with a tension tab in place in the tension tab mount according to an embodiment of the invention.
Figure 37:
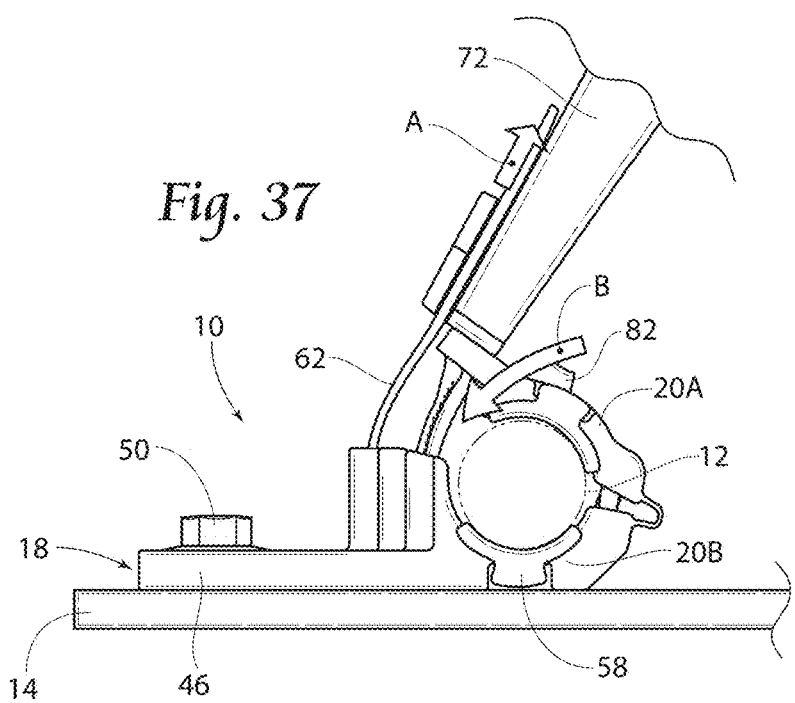
FIG. 37 is a side elevation view of the adjustable P-clamp illustrated in FIG. 36 and showing the tension tab being tightened by a hand held device according to an embodiment of the invention.
Figure 38:
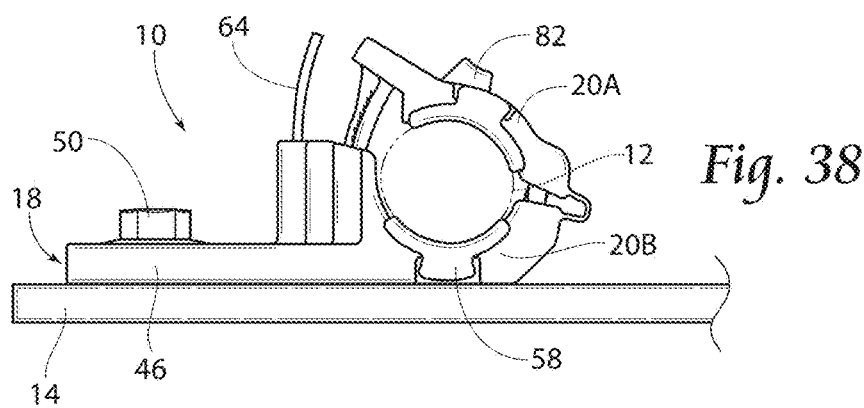
FIG. 38 is a view of the adjustable P-clamp illustrated in FIG. 37 but with the tension tab fully tightened, the P-clamp is closed and secured around an elongate object, and the tension tab tail severed according to an embodiment of the invention.
Figure 39:
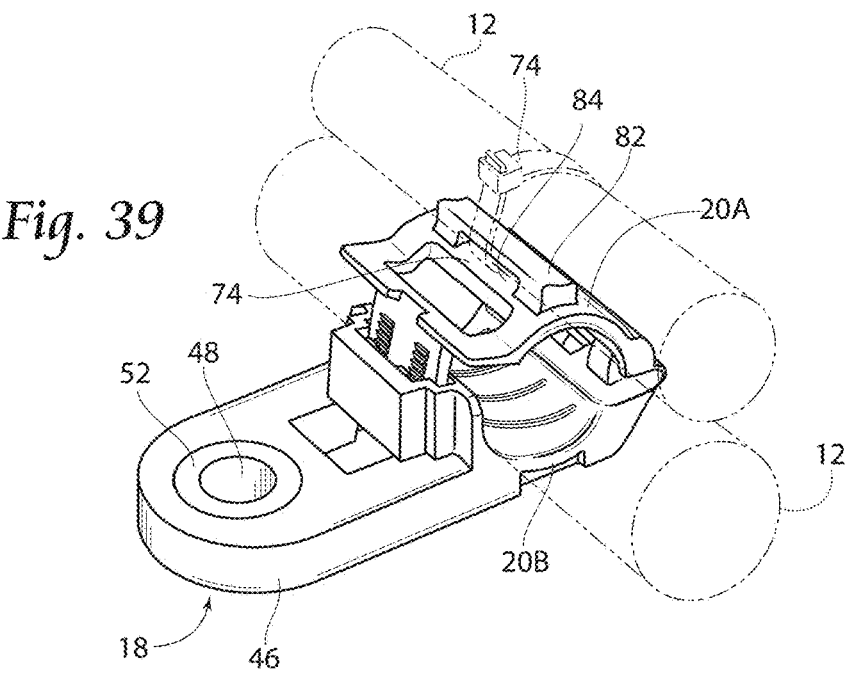
FIG. 39 is a perspective view of an assembly similar to that illustrated in FIG. 8, but showing a second bundle attached to a saddle mount according to an embodiment of the invention.

In the unlikely event that the hinge mechanism fractures and the clamp members 16A becomes detached or lost, the remaining portion of the adjustable P-clamp may be used as a saddle mount by using a flexible cable tie to secure the bundle against the saddle mount base as shown in FIGS. 35A and 35B. This is beneficial for customers trying to provide a quick repair of a broken adjustable P-clamp. For example, an over-the-road truck driver making an emergency repair of a leaking hydraulic hose may accidentally sever the hinge of the adjustable P-clamp while removing the failed hose. The truck driver could successfully secure the new hydraulic hose to the remaining portion of the adjustable P-clamp using a standard cable tie which widely available at a truck stop.

Further, the adjustable P-clamp, by having an inherently flexible design and being formed of impact resistant polymer material, provides isolation and/or vibration dampening for elongate bundles, i.e.; cables, wires, harnesses, hoses, tubing, etc., in comparison to metal P-clamps which does not provide vibration dampening. Vibration dampening reduces the incidence of fatigue failures that occur on non-flexible components that are allowed to vibrate at harmonic frequencies. For example, when metal brake lines vibrate on automobiles at highway speeds, the metal P-clamps that retain the brake lines also vibrate. In this case, without flexible plastic components periodically installed, fatigue failures can occur at brake line connections and on the metal P-clamps.

Another method of using the described clamp assembly 10 and utilizing a tension tab 62 may be seen in the views of FIGS. 36 through 39. A tension tab 62, as previously described, may comprise an elongate strap portion 64 and a head portion (not shown). A tension tab 62 may be used to aid the installer in a controlled closing of the clamp members 16A, 16B around the bundle 12 and to apply proper, accurate tensioning of the clamp members 16A, 16B around the bundle 12. As is shown, and similar to the methods of FIGS. 28 through 33B and 34 through 35B, the mounting element 18 is secured to a support structure 14 by way of a bolt 50. A bundle 12 is placed on arcuate profile 20B and the tension tab 62 is inserted in a tension tab aperture 68 on the adjustable P-clamp 10. The head portion is stopped against an abutment 70 in the tension tab aperture 68, see FIG. 24, while the strap portion 64 extends from the tension tab aperture 68. A handheld tensioning and cutoff tool 72 grasps the strap portion 64 and the handheld tensioning and cutoff tool 72 is actuated to pull the strap portion 64 in the direction of arrow A, also see FIG. 24. The handheld tensioning and cutoff tool 72 pushes against the first clamp member 16A in the direction of arrow B to thereby close the clamp members 16A, 16B with a predetermined tension such that the arcuate tongue 34 and its serrations 42 are engaged by the pawl 38 in the slot opening 36 until a proper tension is achieved and the bundle 12 is secured.

As may further be seen in these views, a clamp assembly 10 according to the present invention may be provided with a saddle mount 82. With particular attention to FIG. 39, a saddle mount 82 may be seen attached to the clamp member 16A and including a tie slot 84. The saddle mount 82 may support a bundle 12 which is secured by a cable tie 74. As shown, the cable tie 74 encircles the bundle 12, is received by the tie slot 84, and thereby attaches the bundle 12 to the saddle mount 82. It is to be understood that while a saddle mount 82 is shown in conjunction with the adjustable P-clamp 10 illustrated in FIGS. 37 through 39, clamp assemblies 10, 10A depicted in other figures may also include a saddle mount 82. The saddle mount 82 provides the benefit of securing separated parallel bundles to the adjustable P-clamp 10.

The views of FIGS. 40 through 42 illustrate another embodiment of a clamp assembly 10B according to the present invention which combines previously described features. As in other described embodiments, the adjustable P-clamp 10B of these views includes an integrally formed clamp member 16 and a mounting element 18, the clamp member 16 having a pair of locking clamp members 16A, 16B each defining an arcuate profile 20A, 20B. As shown, the arcuate profiles 20A, 20B may further include ridges 21 projecting from the arcuate profiles 20A, 20B to aid in securing a bundle 12 (not shown in these views) within the clamp member 16 and help prevent unwanted rotation of the bundle 12 during vibration or other movement of the adjustable P-clamp 10B. As with the previous embodiment, although not shown, the adjustable P-clamp 10B of these views may include a cradle member 58. Moreover, a hinge mechanism 22 may include an area of reduced thickness 24 to allow the hinge mechanism 22 to move freely during the installation and securing of a bundle 12. As further shown, and as also described in previous embodiments, the hinge mechanism 22 may include a hinge interlocking mechanism 26 in which the arcuate projection 28 is configured for reception into a corresponding channel 30.

The embodiment illustrated in FIGS. 40 through 42 further includes a lock mechanism 32 similar to that of previous embodiments, wherein the lock mechanism 32 is comprised of a arcuate tongue 34 and a slot opening 36 having an engaging pawl 38. The pawl 38 may include a wedge release aid 86 as was described with reference to FIGS. 33A and 33B. As shown, the protruding beam 40 of a first clamp member 16A may include an extending arcuate tongue 34, with a slot opening 36 being positioned adjacent a second arcuate profile 20B. The arcuate tongue 34 is preferably molded with a plurality of serrations 42, which extend along the length of the arcuate tongue 34 and across the width of the arcuate tongue 34. The serrations 42 may be arranged in two parallel rows as shown, with the wedge release aid 86 positioned between the rows of serrations 42.

As previously mentioned, the arcuate tongue 34 is adapted to be received in a corresponding slot opening 36 adjacent the second arcuate profile 20B. The engaging pawl 38 located in the slot opening 36 may include teeth 44 arranged in two parallel rows to correspond to the width of the serrations 42 on the arcuate tongue 34. As in previous embodiments, the serrations 42 engage the teeth 44 on the engaging pawl 38 when the arcuate tongue 34 is inserted into the slot opening 36 for retaining the bundle 12. The arcuate tongue 34 may further include a pair of spaced apart serration rails 43 to minimize damage to the serrations 42 by a release tool 76, see FIGS. 32, 33A, and 33B, should opening of the lock mechanism 32 be desired. The arcuate tongue 34 may be reinforced by way of the flanges 92 illustrated. The flanges 92 reduce twisting or buckling of the arcuate tongue 34 in use. As illustrated, the mounting member 46 of the embodiment shown may be overmolded.

Figure 43:
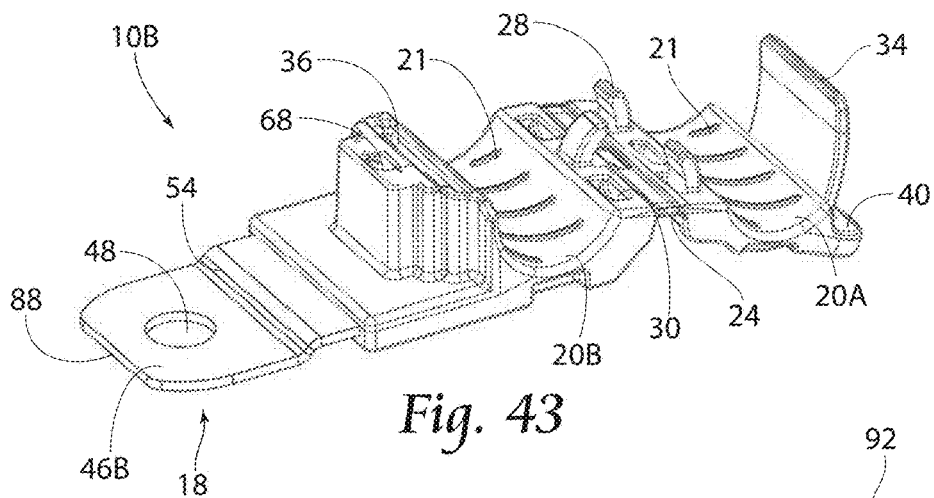
FIG. 43 is a perspective view of an alternative assembly, similar to that shown in FIG. 40, but having a metal fastening tab with flattened portions according to an embodiment of the invention.
Figure 44:
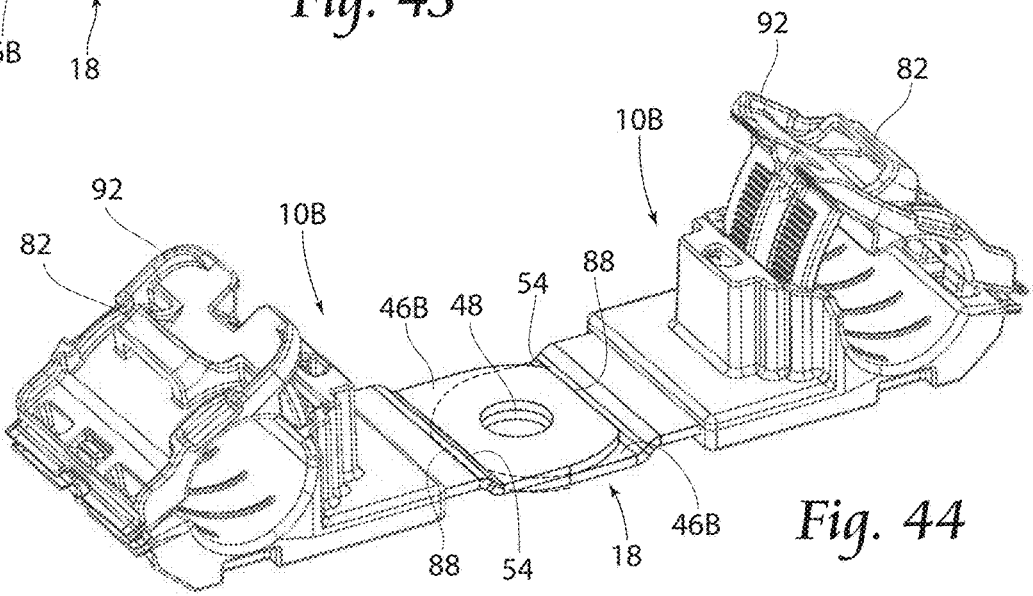
FIG. 44 is a perspective view showing two assemblies as illustrated in FIG. 43 with the flattened portions of metal fastening tabs nested against stepped portions according to an embodiment of the invention.
Figure 45:
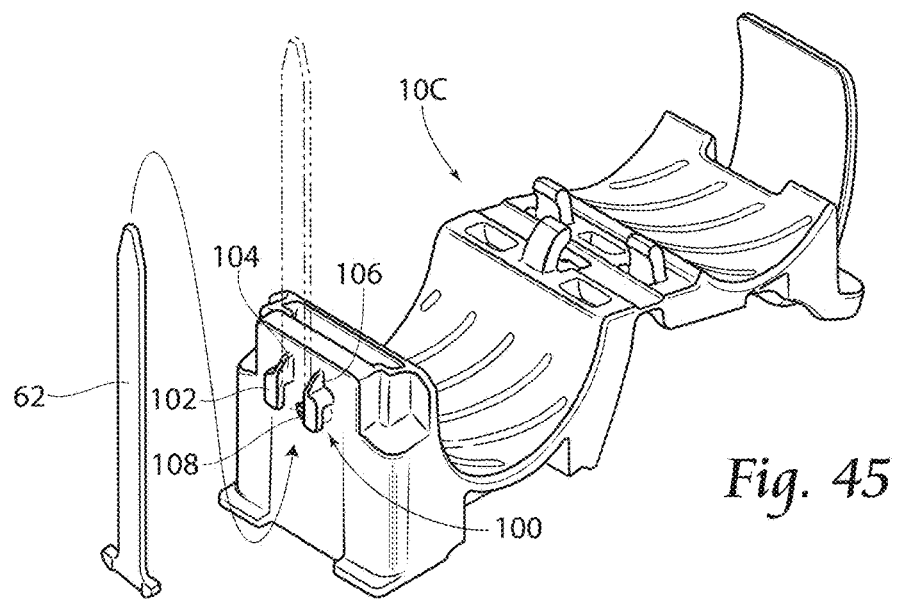
FIG. 45 is a perspective view of an alternate assembly and showing a tension tab lock and a tension tab in place for use according to an embodiment of the invention.

FIGS. 43 and 44 illustrate a variation of the adjustable P-clamp 10B featured in FIGS. 40 through 42. The adjustable P-clamp of these views includes an over molded mounting member 46B having flattened profile portions 88. The flattened profile portions 88 allow nesting of two clamp assemblies 10B, as is illustrated in FIG. 43. As shown, the flattened profile portions 88 of the mounting members 46B nest against stepped portions 54 of a corresponding clamp assembly 10B, thereby allowing facile use of multiple adjacent clamp assemblies 10B.

The embodiment in FIGS. 45 through 48 illustrates an alternative clamp assembly 10C featuring a variation of the tension tab mount 100 as featured in all previous embodiments. The tension tab mount 100 is comprised of a plurality of substantially symmetrical tab mount flanges 102 having an inner face 104 and an outer face 106. The tab mount flanges 102 are spaced apart the approximately the width of the tension tab 62. To mount the tension tab 62, the user glidingly inserts the tension tab 62 in between the tab mount flanges 102 tangentially contacting the inner faces 104. And the tension tab 62 is locked in place by the tab securing wedge 108. To dismount, the user applies pressure to the outer face 106 and the tab securing wedge 108 to dislodge the tension tab 62.

Regarding FIGS. 47, 48 and 53 through 54, the illustrated embodiment features a clamp mounting attachment 110 for purposes of mounting the adjustable P-clamp on a surface using an adhesive pad 124 and adhesive surface 116. The clamp mounting attachment 110 is horizontally guided into the mounting insert channel 130 of the adjustable P-clamp, wherein the upper surface 112 of the clamp mounting attachment 110 is guided and frictionally engages with the upper channel surface 130A; the substantially symmetrical and mirrored channel wings 132 frictionally engage with the mounting attachment's groove surface 122 and mid surface 118 to keep the clamp mounting attachment 110 in guided position within the mounting insert channel 130. The curved wedge clip face 120A is guided under the channel wedge 126 and the wedge clip 120 is secured on the outer face of the wedge clip 126A.

Figure 51:
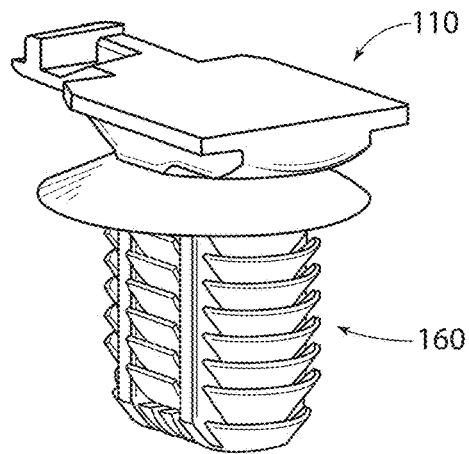
FIG. 51 is a perspective view of a variation of the mounting insert as illustrated in FIG. 48, configured with a mounting oval fir tree according to an embodiment of the invention.
Figure 52:
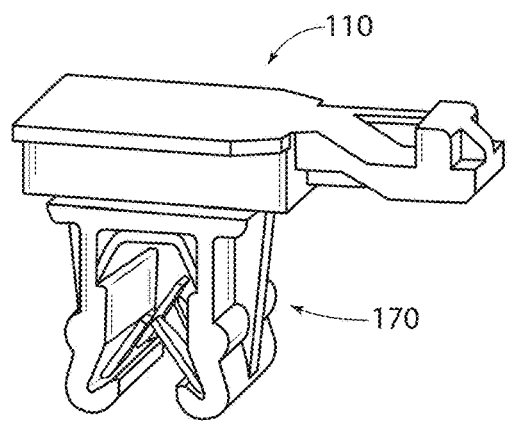
FIG. 52 is a perspective view of a variation of the mounting insert as illustrated in FIG. 48, configured with a mounting edge clip according to an embodiment of the invention.
Figure 53:
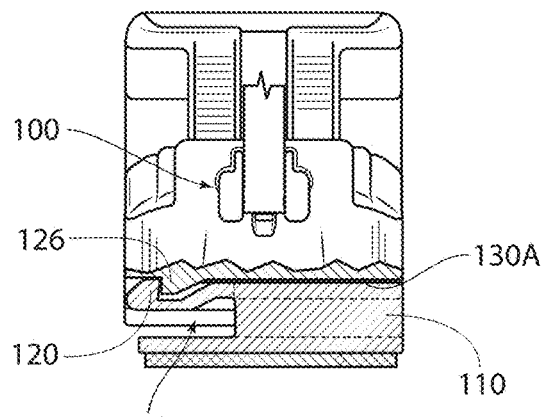
FIG. 53 is a front elevation view of an assembly as illustrated in FIGS. 45 through 48 and showing a partial sectional view of the mounting insert positioned in the mounting channel according to an embodiment of the invention.
Figure 54:
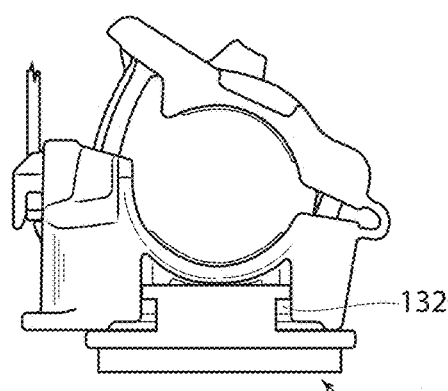
FIG. 54 is a side elevation view of an assembly as illustrated in FIGS. 45 through 48 showing the mounting insert positioned in the mounting channel according to an embodiment of the invention.

FIGS. 49 through 52 feature multiple configurations of the clamp mounting attachment 110 to be used with various mounting approaches. FIG. 49 illustrates the mounting configured with a mounting arrowhead 140. FIG. 50 illustrates the mounting attachment configured with a mounting fir tree 150. FIG. 51 illustrates the mounting attachment configured with a mounting oval fir tree 160. FIG. 52 illustrates the mounting attachment configured with a mounting edge clip 170.

Figure 55A:
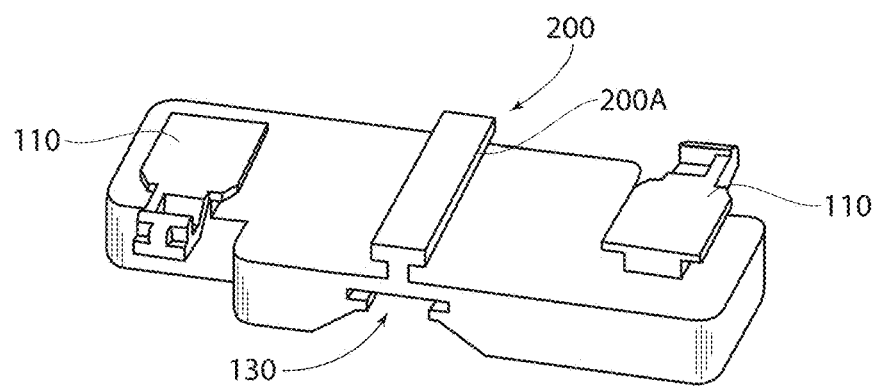
FIG. 55A is a perspective view of variation of a mounting assembly having two mounting inserts as illustrated in FIG. 48 according to an embodiment of the invention.
Figure 55B:
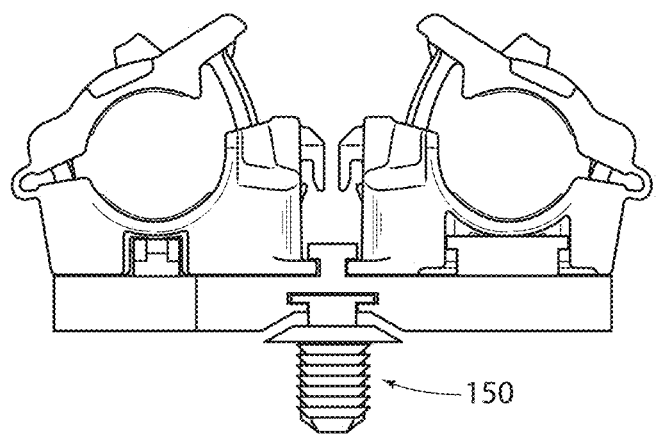
FIG. 55B is a front view of FIG. 55A, showing two assemblies as illustrated in FIG. 45 affixed with the mounting inserts positioned in the mounting channels according to an embodiment of the invention.

FIGS. 55A and 55B illustrate another variation of the clamp mounting assembly. The adjustable P-clamp of these views includes a groove member 200 having an elevated lip member 200A. The elevated lip member 200A allow the outer lips of the adjustable P-clamp 10C to nestle into the grooves of the groove member 200, thereby allowing facile use of multiple adjacent clamp assemblies 10C.

Figure 56A:
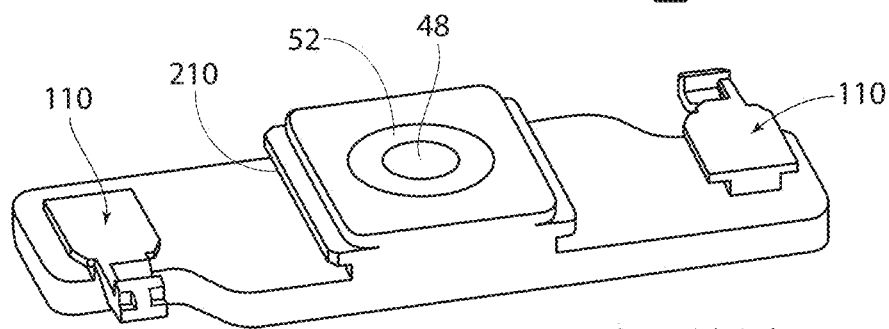
FIG. 56A is a perspective view of a variation of the mounting assembly as illustrated in FIG. 55A, having a mounting aperture sized and dimensioned to receive an attachment feature, such as a bolt according to an embodiment of the invention.
Figure 56B:
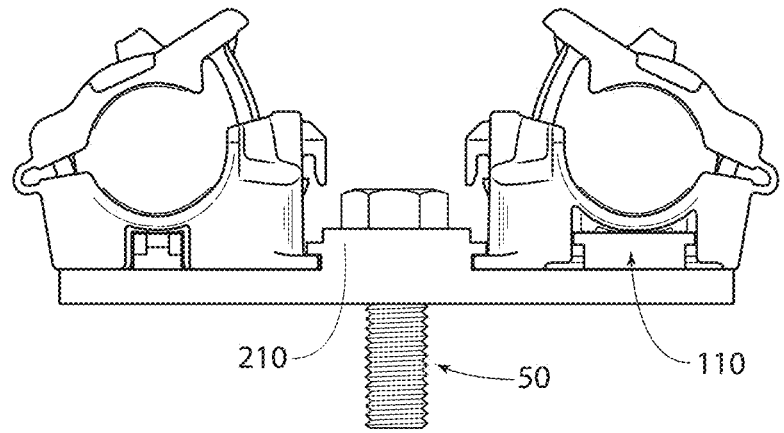
FIG. 56B is a front view of FIG. 56A, showing two assemblies as illustrated in FIG. 45 affixed with the mounting inserts positioned in the mounting channels and a bolt positioned in the mounting aperture according to an embodiment of the invention.
Figure 58:
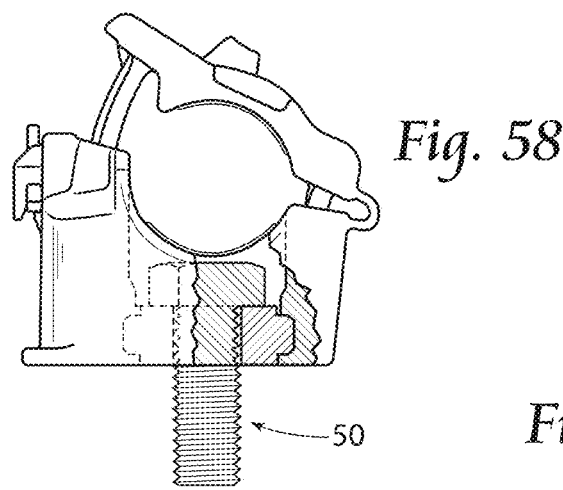
FIG. 58 is a side elevation view of a mounting assembly as illustrated in FIGS. 56A and 56B with showing a partial sectional view of the mounting insert positioned in the mounting channel as well as the bolt positioned in the mounting aperture according to an embodiment of the invention.

FIGS. 56A, 56B, and 58 illustrate another variation of the clamp mounting assembly. The adjustable P-clamp of these views includes a molded lip member 210 allowing for the outer lips of the adjustable P-clamp 10C to nestle into the grooves of the lip member 210, thereby allowing facile use of multiple adjacent clamp assemblies 10C. The lip member 210 is formed to house a mounting aperture 48 sized and dimensioned to receive an attachment feature, such as a bolt 50.

Figure 57A:
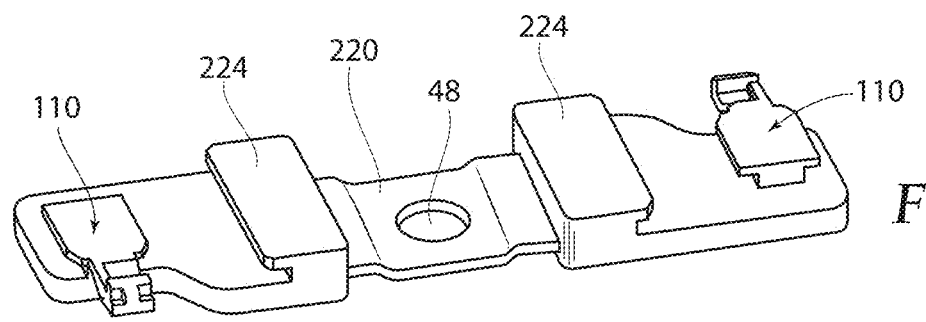
FIG. 57A is a perspective view of a variation of a mounting assembly having two mounting inserts as illustrated in FIGS. 56A and 56B, having a mounting aperture sized and dimensioned to receive an attachment feature, such as a bolt according to an embodiment of the invention.
Figure 57B:
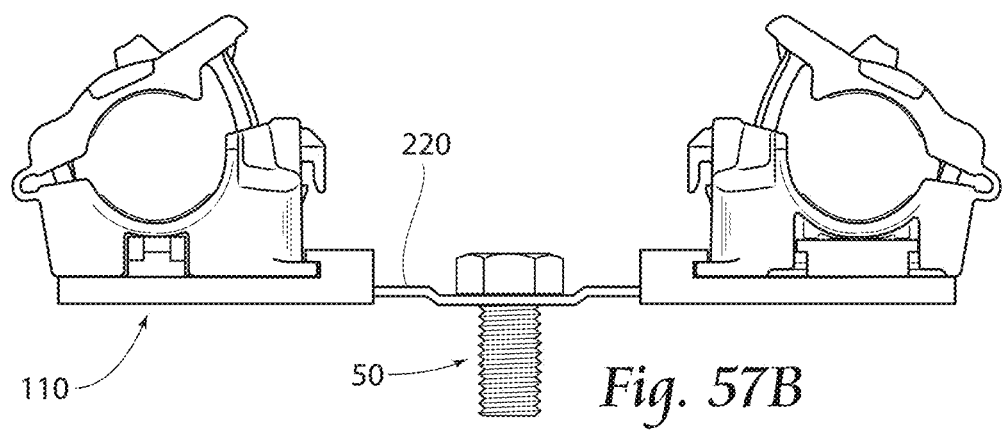
FIG. 57B is a front elevation view of FIG. 57A, showing two assemblies as illustrated in FIG. 45 affixed with the mounting inserts positioned in the mounting channels and a bolt positioned in the mounting aperture according to an embodiment of the invention.
Figure 59:
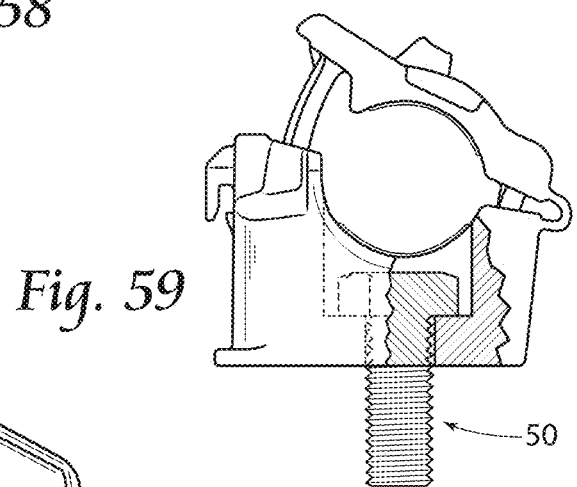
FIG. 59 is a side elevation view of a mounting assembly as illustrated in FIGS. 57A and 57B with showing a partial sectional view of the mounting insert positioned in the mounting channel as well as the bolt positioned in the mounting aperture according to an embodiment of the invention.

FIGS. 57A, 57B, and 59 illustrate another variation of the adjustable P-clamp. The adjustable P-clamp of these views includes a mounting member 220 and mirrored lip wings 224. The lip wings 224 allow the outer lips of the adjustable P-clamp 10C to nestle under the grooves to lock maintain firm position on the adjustable P-clamp, as is illustrated in FIG. 57B. As shown, the mounting member 220 lip member 210 is formed to house a mounting aperture 48 sized and dimensioned to receive an attachment feature, such as a bolt 50.

Figure 60:
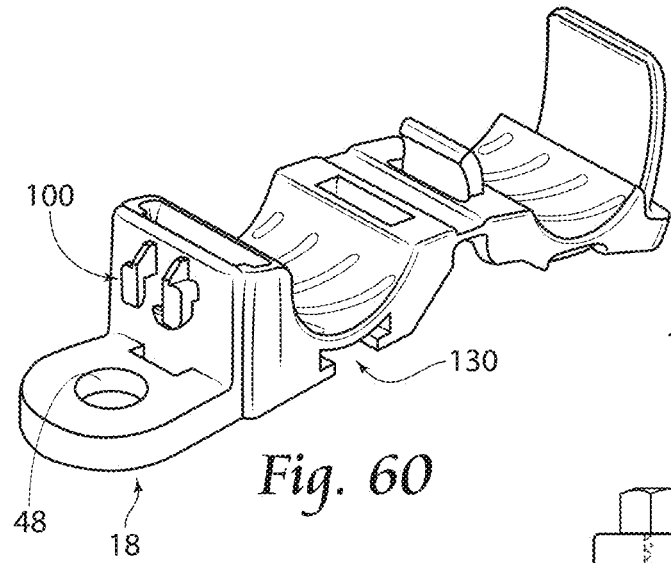
FIG. 60 is a perspective view of a variation of the P-clamp shown in FIG. 45 view showing a tension tab lock and tension tab illustrated in FIG. 45, but showing a mounting aperture to receive a bolt according to an embodiment of the invention.
Figure 61:
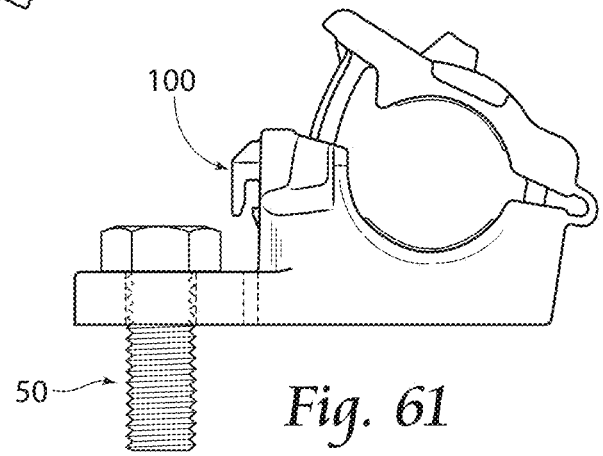
FIG. 61 is a side view of FIG. 60, showing a bolt positioned in the mounting aperture according to an embodiment of the invention.

FIGS. 60 and 61 illustrate clamp assembly 10C also having mounting element 18 for securing clamp-restrained elongated articles or bundles 12 to a support structure 14.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'One or more' includes a function being performed by one element, a function being performed by more than one element, e.g., in a distributed fashion, several functions being performed by one element, several functions being performed by several elements, or any combination of the above. Also, as used herein substantially parallel means±15° of absolutely parallel and substantially perpendicular means±15° of absolutely perpendicular.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

While terms of ordinance or orientation may be used herein, these elements should not be limited by these terms. All terms of ordinance or orientation, unless stated otherwise, are used for purposes distinguishing one element from another, and do not denote any particular order, order of operations, direction or orientation unless stated otherwise.

What is claimed is:

1. A mounting bracket assembly, comprising:
a clamp member formed of a plastic material defining a first clamp member and a second clamp member joined to the first clamp member by a hinge mechanism, wherein the first and second clamp members each define an arcuate profile shaped to enclose an elongate member, the first and second clamp members further defining a hinge interlocking mechanism, the hinge interlocking mechanism comprising:
a first arcuate projection extending from the first clamp member;
a second arcuate projection extending from the second clamp member;
a first arcuate aperture extending into the first clamp member; and
a second arcuate aperture extending into the second clamp member,
wherein the first arcuate projection is configured to be received within the first arcuate aperture, and
wherein the second arcuate projection is configured to be received within the second arcuate aperture;
a locking mechanism having a tongue member projecting from the first clamp member and a slotted opening defined by the second clamp member, wherein the tongue member is configured to be releasably received in the slotted opening, wherein the slotted opening is positioned adjacent the arcuate profile of the second clamp member, and wherein the tongue member defines a plurality of serrations extending along a length of the tongue member and across a width of the tongue member;
a wedge-shaped pawl having a plurality of teeth disposed within the slotted opening, wherein the plurality of teeth are configured to interlock with the plurality of serrations when the tongue member is inserted into the slotted opening; and
a mounting member defining a mounting aperture configured to receive an attachment feature therethrough.

2. The mounting bracket assembly according to claim 1, wherein the mounting member is integrally formed with the clamp member of the plastic material forming the clamp member.

3. The mounting bracket assembly according to claim 2, wherein the mounting member further includes an aperture reinforcement member encircling the mounting aperture.

4. The mounting bracket assembly according to claim 1, wherein the mounting member is formed of a metallic material and is over molded within the clamp member.

5. The mounting bracket assembly according to claim 4, wherein the mounting member is characterized as having a first portion extending from the clamp member and a second portion defining the mounting aperture.

6. The mounting bracket assembly according to claim 5, wherein the first portion is non-coplanar with the second portion.

7. The mounting bracket assembly according to claim 6, further comprising:
the first portion substantially parallel to and offset from the second portion; or
the first portion angled relative to the second portion.

8. The mounting bracket assembly according to claim 1, further comprising an elongate tension tab coupled to said clamp member, wherein the tension tab is configured to be received by a tensioning device to apply a predetermined pressure to said first and second clamp members.

9. The mounting bracket assembly according to claim 8, wherein the tension tab defines a T-shaped head and the tension tab is received within a tension tab aperture defined by the second clamp member.

10. The mounting bracket assembly according to claim 1, wherein the second clamp member defines a second arcuate projection configured to be received within a corresponding second arcuate channel defined by the first clamp member.

11. The mounting bracket assembly according to claim 1, wherein the first clamp member includes a saddle mount defining a tie slot intermediate the saddle mount and the first clamp member, said tie slot configured to receive an elongate cable tie.

12. The mounting bracket assembly according to claim 11, wherein the saddle mount is substantially parallel to the elongate member and the tie slot is substantially perpendicular to the elongate member.

13. The mounting bracket assembly according to claim 1, wherein the tongue member projects from a protruding beam of the first clamp member and wherein the protruding beam is configured to provide a platform for manual manipulation of the first clamp member to insert the tongue member within the slotted opening.

14. The mounting bracket assembly according to claim 1, wherein the first clamp member and the second clamp member each define a plurality of parallel ridges in their inner surfaces.

15. The mounting bracket assembly according to claim 14, wherein the plurality of parallel ridges are configured to be non-parallel with the elongate member.

16. The mounting bracket assembly according to claim 1, wherein the hinge mechanism maintains alignment between the tongue member and the slotted opening as the first clamp member is closed around the elongate member.

17. The mounting bracket assembly according to claim 16, wherein the hinge mechanism maintains alignment between the plurality of serrations and the wedge-shaped pawl as the first clamp member is closed around the elongate member.

18. The mounting bracket assembly of claim 1, wherein the hinge interlocking mechanism further comprises at least one of:
the first arcuate projection spaced apart from a first side of the first clamp member and the first arcuate aperture spaced apart from a first side of the second clamp member; or
the second arcuate projection spaced apart from a second side of the second clamp member and the second arcuate aperture spaced apart from a second side of the second clamp member.

19. The mounting bracket assembly of claim 1, wherein the hinge interlocking mechanism further comprises:
a third arcuate projection extending from the first clamp member and a third arcuate aperture extending into the second clamp member, the third arcuate projection configured to be received within the third arcuate aperture, the third arcuate projection located between first arcuate aperture and the second arcuate aperture.

20. The mounting bracket assembly of claim 1, wherein the hinge interlocking mechanism further comprises:
a fourth arcuate projection extending from the second clamp member and a fourth arcuate aperture extending into the first clamp member, the fourth arcuate projection configured to be received within the fourth arcuate aperture, the fourth arcuate projection located between first arcuate aperture and the second arcuate aperture.

* * * * *